US011256866B2

(12) United States Patent
Lao et al.

(10) Patent No.: US 11,256,866 B2
(45) Date of Patent: Feb. 22, 2022

(54) NATURAL LANGUAGE PROCESSING WITH AN N-GRAM MACHINE

(71) Applicant: Google LLC, Mountain View, CA (US)

(72) Inventors: Ni Lao, Belmont, CA (US); Jiazhong Nie, Mountain View, CA (US); Fan Yang, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 662 days.

(21) Appl. No.: 16/069,781

(22) PCT Filed: Oct. 25, 2017

(86) PCT No.: PCT/US2017/058229
§ 371 (c)(1),
(2) Date: Jul. 12, 2018

(87) PCT Pub. No.: WO2019/083519
PCT Pub. Date: May 2, 2019

(65) Prior Publication Data
US 2020/0364408 A1    Nov. 19, 2020

(51) Int. Cl.
*G06F 40/30*        (2020.01)
*G06N 3/04*         (2006.01)
(Continued)

(52) U.S. Cl.
CPC .......... *G06F 40/30* (2020.01); *G06N 3/0445* (2013.01); *G06N 3/0454* (2013.01); *G06N 5/022* (2013.01); *G06F 16/90332* (2019.01)

(58) Field of Classification Search
CPC . G06F 40/30; G06F 16/90332; G06N 3/0445; G06N 3/0454
See application file for complete search history.

(56) References Cited

U.S. PATENT DOCUMENTS

| 7,702,508 B2 | 8/2010 | Bennett |
| 7,860,706 B2 | 12/2010 | Abir |

(Continued)

FOREIGN PATENT DOCUMENTS

| CA | 2335801 | 5/2002 |
| CN | 106502979 | 3/2017 |

(Continued)

OTHER PUBLICATIONS

Dai et al., "CFO: Conditional Focused Neural Question Answering with Large-Scale Knowledge Bases", Proceedings of the 54th Annual Meeting of the Association for Computational Linguistics, Berlin Germany, Aug. 7-12, 2016, pp. 800-810.

(Continued)

*Primary Examiner* — Michael N Opsasnick
(74) *Attorney, Agent, or Firm* — Dority & Manning, P.A.

(57) ABSTRACT

The present disclosure provides systems and methods that perform machine-learned natural language processing. A computing system can include a machine-learned natural language processing model that includes an encoder model trained to receive a natural language text body and output a knowledge graph and a programmer model trained to receive a natural language question and output a program. The computing system can include a computer-readable medium storing instructions that, when executed, cause the processor to perform operations. The operations can include obtaining the natural language text body, inputting the natural language text body into the encoder model, receiving, as an output of the encoder model, the knowledge graph, obtaining the natural language question, inputting the natural language question into the programmer model, receiving the program as an output of the programmer model, and executing the program on the knowledge graph to produce an answer to the natural language question.

20 Claims, 9 Drawing Sheets

(51) Int. Cl.
*G06N 5/02* (2006.01)
*G06F 16/9032* (2019.01)

(56) References Cited

U.S. PATENT DOCUMENTS

| | | | |
|---|---|---|---|
| 7,873,519 | B2 | 1/2011 | Bennett |
| 9,715,496 | B1 | 7/2017 | Sapoznik et al. |
| 2005/0055209 | A1 | 3/2005 | Epstein et al. |
| 2009/0138415 | A1 | 5/2009 | Lancaster |
| 2010/0023331 | A1 | 1/2010 | Duta et al. |
| 2011/0202334 | A1 | 8/2011 | Abir |
| 2011/0270604 | A1 | 11/2011 | Qi et al. |
| 2012/0150531 | A1 | 6/2012 | Bangalore et al. |
| 2014/0108103 | A1 | 4/2014 | Romaine et al. |
| 2014/0136188 | A1 | 5/2014 | Wroczynski et al. |
| 2014/0156260 | A1 | 6/2014 | Zweig et al. |
| 2016/0042296 | A1* | 2/2016 | Shan ............... G06F 16/9535 706/11 |
| 2016/0092434 | A1 | 3/2016 | Bellegarda |
| 2016/0124962 | A1 | 5/2016 | Barborak et al. |
| 2016/0247061 | A1 | 8/2016 | Trask et al. |
| 2017/0060844 | A1 | 3/2017 | He et al. |
| 2017/0091168 | A1 | 3/2017 | Bellegarda et al. |
| 2017/0091169 | A1 | 3/2017 | Bellegarda et al. |
| 2017/0109355 | A1* | 4/2017 | Li ..................... G06N 3/0445 |
| 2017/0177715 | A1 | 6/2017 | Chang et al. |
| 2017/0199928 | A1 | 7/2017 | Zhao et al. |
| 2017/0200077 | A1 | 7/2017 | Weston et al. |
| 2018/0150739 | A1* | 5/2018 | Wu ..................... G06N 3/006 |
| 2020/0202194 | A1* | 6/2020 | Wu ..................... G06N 3/004 |

FOREIGN PATENT DOCUMENTS

| | | |
|---|---|---|
| CN | 106663124 | 5/2017 |
| CN | 106997376 | 8/2017 |
| EP | 3156949 | 4/2017 |
| JP | 2001075585 | 3/2001 |
| JP | 2004151757 | 5/2004 |
| WO | WO 2002103673 | 12/2002 |
| WO | WO 2005036303 | 4/2005 |

OTHER PUBLICATIONS

International Search Report with Written Opinion for PCT/US2017/058229 dated Jul. 25, 2018, 18 pages.
Liang et al., "Neural Symbolic Machines: Learning Semantic Parsers on Freebase with Weak Supervision", arXiv: 1611.00020v3, Nov. 3, 2016, 12 pages.
Yang et al., "Learning to Organize Knowledge with N-Gram Machines", arXiv:1711.06744v1, Nov. 17, 2017, 16 pages.
Yin et al., "Neural Generative Question Answering", arXiv: 1512.01337v4, Apr. 22, 2016, 12 pages.
Block, "Assimilation, Accommodation, and the Dynamics of Personality Development", Child Development, vol. 53, No. 2, Apr. 1982, pp. 281-295.
Carpenter et al., "Adaptive Resonance Theory", The Handbook of Brain Theory and Neural Networks, 2003, pp. 87-90.
Dong et al., "Knowledge Vault: A Web-Scale Approach to Probabilistic Knowledge Fusion", 20th Association for Computing Machinery International Conference on Knowledge Discovery and Data Mining, New York, New York, Aug. 24-27, 2014, 10 pages.
Graves et al., "Hybrid Computing Using a Neural Network with Dynamic External Memory", Nature, vol. 538, Oct. 27, 2016, pp. 471-476.
Graves et al., "Symbolic Reasoning with Differentiable Neural Computers", 2016, 64 pages.
Konstas et al., "Neural AMR: Sequence-to-Sequence Models for Parsing and Generation", arXiv:1704.08381v3, Aug. 18, 2017, 11 pages.
Kumaran et al., "What Learning Systems do Intelligent Agents Need? Complementary Learning Systems Theory Updated", Trends in Cognitive Science, vol. 20, No. 7, Jul. 2016, pp. 512-534.
McCelland et al., "Why There are Complementary Learning Systems in the Hippocampus and NeocorteX: Insights from the Successes and Failures of Connectionist Models of Learning and Memory", Psychological Review, vol. 102, No. 3, Jul. 1995, pp. 419-457.
Miao et al., "Language as Latent Variable: Discrete Generative Models for Sentence Compression", arXiv:1609.07317v2, Oct. 14, 2016, 10 pages.
Mintz et al., "Distant Supervision for Relation Extraction without Labeled Data", Proceedings of the 47th Annual Meeting of the Association for Computational Linguistics, Suntec, Singapore, Aug. 2-7, 2009, pp. 1003-1011.
O'Reilly et al., "Complementary Learning Systems", Cognitive Science Society, Inc., 2011, pp. 1229-1248.
Riedel et al., "Relation Extraction with Matrix Factorization and Universal Schemas", Proceedings of North American Chapter of the Association for Computational Linguistics, Atlanta Georgia, Jun. 9-14, 2013, 11 pages.
Santoro et al., "A Simple Neural Network Module for Relational Reasoning", arXiv:1706.01427v1, Jun. 5, 2017, 16 pages.
Schmidhuber, "Optimal Ordered Problem Solver", Machine Learning, vol. 54, No. 3, 2004, pp. 211-254.
Tan et al., "Intelligence Through Interaction: Towards a Unified Theory for Learning", International Symposium on Neural Networks, Advances in Neural Networks, pp. 1094-1095.
Wang et al., "Neural Modeling of Episodic Memory: Encoding, Retrieval, and Forgetting", Institute of Electrical and Electronics Engineers Transactions on Neural Networks and Learning Systems, vol. 23, No. 10, Oct. 2012, pp. 1574-1586.
Weston et al., "Memory Networks", arXiv:1410.3916v10, May 19, 2015, 15 pages.
Barak et al., "There and Back Again: Autoencoders for Textual Reconstruction", Jul. 1, 2015, https://webarchive.org/web/20150701011653if_http://cs224d.stanford.edu:80/reports/OshriBarak.pdf, 9 pages.

\* cited by examiner

NATURAL LANGUAGE PROCESSING WITH AN N-GRAM MACHINE

FIELD

The present disclosure relates generally to machine learning. More particularly, the present disclosure relates to performing natural language processing via machine learning.

BACKGROUND

Natural Language Processing (NLP) can involve answering natural language questions based on information contained within natural language documents. Accurately answering such questions can often involve semantic parsing both of the natural language questions and the documents. Effective semantic parsing often relies on a human-curated knowledge base with manually defined schema. This approach, however, can be labor intensive, which can make it expensive to both develop and maintain.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system can include at least one processor and a machine-learned natural language processing model. The machine-learned natural language processing model can include an encoder model that is trained to receive a natural language text body and, in response to receipt of the natural language text body, output a knowledge graph. The machine-learned natural language processing model can include a programmer model that is trained to receive a natural language question, and, in response to receipt of the natural language question, output a program. The computing system can include at least one tangible, non-transitory computer-readable medium that stores instructions that, when executed by the at least one processor, cause the at least one processor to perform operations. The operations can include obtaining the natural language text body and inputting the natural language text body into the encoder model. The operations can include receiving, as an output of the encoder model, the knowledge graph. The operations can include obtaining the natural language question and inputting the natural language question into the programmer model. The operations can include receiving, as an output of the programmer model, the program, and executing the program on the knowledge graph to produce an answer to the natural language question.

Another example aspect of the present disclosure is directed to a computer-implemented method including obtaining, by one or more computing devices, a natural language processing model that includes an encoder model, a decoder model, and a programmer model. The encoder model can be configured to receive a natural language text body and, in response to receipt of the natural language text body, output a knowledge graph. The decoder model can be configured to receive the knowledge graph and, in response to receipt of the knowledge graph, output a reconstruction of the natural language text body. The programmer model can be trained to receive a natural language question, and, in response to receipt of the natural language question, output a program. The computer-implemented method can include inputting, by the one or more computing devices, a training data set that comprises the natural language text body and the natural language question into the natural language processing model to receive an answer to the natural language question. The computer-implemented method can include evaluating, by the one or more computing devices, a total objective function that comprises an autoencoder objective function and a question answer objective function. The autoencoder objective function can describe a reconstruction loss between the natural language text body and the reconstruction of the natural language text body. The question answer objective function can describe a reward that is based on a comparison of the answer and an expected answer included in the training data set. The computer-implemented method can include training, by the one or more computing devices, the natural language processing model based on the total objective function.

Another example aspect of the present disclosure is directed to a computing system for responding to a natural language query. The computing system can include an encoding system configured to receive a natural language text body and generate, using a machine-learned natural language encoder model, a knowledge graph based on the natural language text body. The computing system can include a query programming system configured to receive a natural language input query, and generate, using a machine-learned natural language query programmer model, a program for querying the knowledge graph based on the natural language input query. The query execution system can be configured to execute the generated program on the generated knowledge graph and to output a query response.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
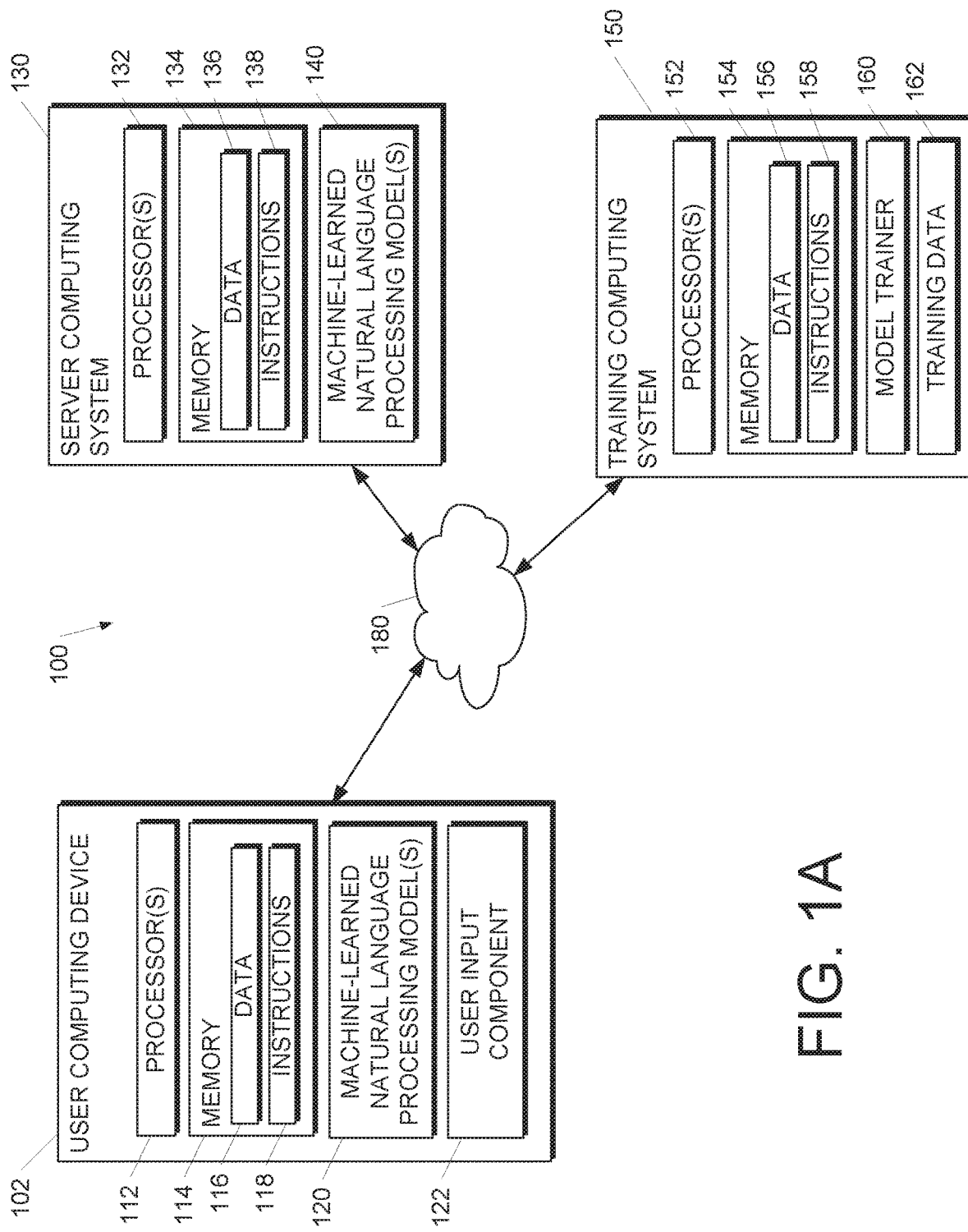
FIG. 1A depicts a block diagram of an example computing system that performs natural language processing according to example aspects of the present disclosure.

Reference numerals that are repeated across plural figures are intended to identify the same features in various implementations.

DETAILED DESCRIPTION

Overview

Generally, the present disclosure is directed to systems and methods that include or otherwise leverage use of a natural language processing model that is configured to answer a natural language question based on a natural language text body, such as a series of sentences forming a narrative or story. In particular, the natural language processing model can receive a natural language question related to information contained in the natural language text body and, in response, provide an answer to the question. In one example, the natural language processing model can include one or more machine-learned models, such as an encoder model and a programmer model. In some implementations, one or more of the encoder model and programmer model can include a neural network, such as a recurrent neural network and/or a sequence-to-sequence neural network. In particular, according to an aspect of the present disclosure, the encoder model can be trained to receive the natural language text body and output a knowledge graph representing the information contained with the natural language text. The programmer model can be trained to output a program in response to the natural language question. This program can then be executed on the knowledge graph to produce an answer to the natural language question. For instance, in some implementations, the program can include one or more functions configured to search the knowledge graph and locate one or more words to answer the natural language question. In such fashion, the systems and methods of the present disclosure can provide improved answering of natural language questions based on natural language text. Additionally, in some implementations, the systems and methods disclosed herein can symbolically store information contained within a natural language text body in a manner that provides scalability for large volumes of text.

More particularly, aspects of the present disclosure are directed to a natural language processing model that enables answering of a natural language text question based on a natural language text body. The natural language processing model can be implemented or otherwise executed by a computing system. In one example, a server computing device (e.g., a search server) can implement the natural language processing model to answer natural language questions entered by users on a user computing device. For example, the natural language question can be a search query and the natural language text body can include one or more web pages or other web documents identified during a web search. As another example, a single computing device such as, for example, a user computing device (e.g., smartphone, tablet, personal assistant device, etc.) can implement the natural language processing model to answer natural language questions provided to the device by a user (e.g., in the style of a question posed to a personal assistant).

Thus, in some implementations, a user can enter the natural language text body into a user computing device to provide the natural language text body to the natural language processing model. In other implementations, the natural language processing model can independently obtain the natural language text body from an external source, such as one or more websites related to the natural language question, for example. The computing system (e.g., the server computing device and/or the user computing device) can input the natural language text body into the encoder model and receive the knowledge graph. The user can enter the natural language question into the user computing device so that the natural language question is provided to the natural language processing model. The computing system can input the natural language question into the programmer model and receive the program. The computing system can then execute the program on the knowledge graph to produce an answer to the natural language question.

The use of a natural language processing model in the systems and methods of the present disclosure provide a number of technical advantages to the system itself as well as the user. For example, by providing the knowledge graph using the encoder model, the operation time and processing time required for a user to program and maintain the knowledge graph can be reduced. A reduction in the operation input of a user can provide a corresponding reduction in at least the power consumption of a user interface device and an associated processing unit. Furthermore, the natural language text body can be gathered by the encoder from a substantially larger field of natural language texts via the Internet, such as, for example, scientific research, medical research, news articles, etc.

In this way, the natural language processing model can provide improved scalability of the knowledge graph, with a corresponding contribution to at least the accuracy of the natural language question response. In some implementations, as will be described in more detail below, the encoder model and the programmer model can be trained in a coordinated process with further improvements to at least the accuracy of the natural language question response. Accurate answering of natural language questions based on natural language text can have many uses, for example, it can be implemented to provide or improve a digital personal assistant program. As such, improvements in the accuracy of such a program can result in fewer inputs by a user e.g. to repeat a question or request clarification of a response, and consequently fewer outputs by the program in response to the user. Corresponding reductions in at least the processor operating time and screen-on time of a user device can be achieved, which can often be particularly important factors for reducing the power consumption of a personal user device.

In some implementations, as will be described in more detail below, the systems and methods disclosed herein can provides scalability for large volumes of text through symbolic storage of information. For instance, in some implementations the complexity of the knowledge graph is independent of the size of the knowledge graph. This can provide a reduction in the storage requirements for the knowledge graph, as well as a faster processing time and/or reduction in the computational demands during operation.

In some implementations, the knowledge graph can include a series of word sequences, referred to as "n-grams"

or "tuples," representing the information contained within the sentences. For instance, in some implementations, each n-gram sequence can include two words, referred to as a "bi-gram." In other implementations, each n-gram sequence can include three words, referred to as "tri-gram." In some implementations, each n-gram sequence can include greater than three words. In yet further implementations, each n-gram can include a different number of words (e.g., the knowledge graph can include bi-grams, tri-grams, or other n-grams, or combinations thereof).

As indicated above, the encoder model can be trained to receive the natural language text body and output a knowledge graph representing the information contained with the natural language text. For example, in response to receiving a natural language text body containing "Mary went back to the kitchen," the encoder model can generate a bi-gram containing "Mary; Kitchen." In another example, in response to receiving a natural language text body containing "John grabbed the apple," the encoder model can generate a tri-gram containing "John; got; apple." According to an aspect of the present disclosure, the machine-learned encoder can learn to generate n-gram representations that best assist in producing the correct answer to a question. Additionally, in some implementations, each n-gram of the knowledge graph can include a respective time stamp representing the order that the sentence appears in the natural language text body. Such time stamps can aid with reasoning involving the order of events described in the natural language text body, for example.

In some implementations, as indicated above, the program output by the programmer model can include a function that causes a search of the knowledge graph. For example, the program can include one or more functions configured to perform a text-based search of the n-grams within the knowledge graph. One example function is "hop," which can be configured to locate each word in the knowledge graph directly following its input. For example "hop Mary" executed on a knowledge graph containing "Mary; Kitchen" can produce "Kitchen." In some implementations, the program output by the programmer model can contain a plurality of function configured to operate together to provide an answer to the natural language question. For instance, an example program can contain a first function configured to locate a first variable, and a second function configured to locate the answer to the natural language question using the first variable as an input. According to an aspect of the present disclosure, the machine-learned programmer model can learn to generate programs that best result in producing the correct answer to a question.

In some implementations, the programmer model can be trained to output a program set that includes a plurality of programs and a plurality of weights. Each weight can be associated with a respective program of the program set and can represent the likelihood that the respective program will generate the expected answer when executed on the natural language text body. In some implementations, the plurality of weights can be used to select a program from the plurality of programs to execute on the knowledge graph to produce an answer which is output by the natural language processing model.

According to additional aspects of the present disclosure, the natural language processing model can include, in at least some instances (e.g., during training of the natural language processing model), a decoder model configured to receive the knowledge graph and output a reconstruction of the natural language text body during training. For example, the decoder model can attempt to generate a reconstruction of the natural language text body that matches the original natural language text body. Thus, when combined, the encoder model and the decoder model can operate as or otherwise be trained in the style of an autoencoder.

According to another aspect of the present disclosure, in some implementations, a method for training the natural language processing model can include evaluating a total objective function that includes an autoencoder objective function and a question answer objective function. The autoencoder objective function can describe a reconstruction loss between the natural language text body and the reconstruction of the natural language text body. The question answer objective function can describe a reward that is based on a comparison of the answer and an expected answer included in the training data set. The method can include training the natural language processing model based on the total objective function. For example, in some implementations, training the natural language processing model can include minimizing the total objective function. For instance, the computing system can calculate respective gradients of each of the autoencoder objective function and the question answer objective function. The computing system can then adjust the various parameters of the models according to the calculated gradients.

In some implementations, evaluating the total objective function can include summing the autoencoder objective function and the question answer objective function. In some implementations, training the natural language processing model can include training the programmer model based at least in part on the question answer objective function. In some implementations, training the natural language processing model can include jointly training the encoder model and the decoder model based at least in part on the autoencoder objective function. Additionally, in some implementations, training the natural language processing model can include alternating, e.g., using a "coordinate ascent approach," between (1) jointly training the encoder and decoder models using the autoencoder objective function, and (2) training the programmer model using the question answer objective function.

In some implementations, the question answer objective function can describe an encoder probability distribution that describes an input of the encoder model with respect to an output of the encoder model. Additionally, in some implementations, the question answer objective function can describe a programmer probability distribution that describes an input of the programmer model with respect to an output of the programmer model.

As indicated above, in some implementations, the autoencoder objective function can describe a reconstruction loss between the natural language text body and the reconstruction of the natural language text body generated by the decoder model. For example, in some implementations, the reconstruction loss can be indicative of the likelihood that each n-gram of the knowledge graph contains the information contained within a respective sentence of the natural language text body. In some implementations, the autoencoder objective function can describe the encoder probability distribution, described above with reference to the question answer objective function, and/or a decoder probability distribution that describes an input of the decoder model with respect to an output of the decoder model.

In some implementations, the definition of the autoencoder objective function can be transitioned during training from a first autoencoder objective function in a first training stage to a second autoencoder objective function in a second training stage. In the first training stage, the first autoencoder objective function can describe the reconstruction loss between the natural language text body and the reconstruction of the natural language text body that is output by the decoder model based on the knowledge graph. In contrast, during the second stage, the second autoencoder objective function can describe the reward that is based on the comparison of the answer and the expected answer included in the training data set. The autoencoder objective function can be transitioned from the first autoencoder objective function to the second autoencoder objective function based on the performance of the encoder model. For example, in some implementations, the autoencoder objective function can be transitioned once the first autoencoder objective function is less than a predetermined threshold value. This can indicate that the knowledge graph contains a sufficiently accurate representation of the information within the natural language text body. At such a point, the transition from the first autoencoder objective function to the second autoencoder objective function can improve the training of the encoder model. For example, it can better train the encoder model to encode the information from the natural language text body into the knowledge graph in a manner that better facilitates correctly answering the natural language question.

During training, in some implementations, a "code assist" function can be used to assist the training of the programmer model. For example, in some implementations, the "code assist" function can prevent the programmer model from outputting programs that cause run-time errors, e.g., fail to produce an answer. For example, the "code assist" function can provide the programmer model with a set of potential functions. The programmer model can then select functions from the set of potential functions to generate the program. For instance, during generation of the program, the "code assist" function can only select potential functions that will not cause any errors. For instance, the "code assist" function can include a built-in set of rules governing the order that the various functions can be assembled. For example, the "code assist" function can choose the functions to provide to the programmer model based on applying the rules to the most recent functions selected by the programmer model.

Additionally, in some implementations, structural tweaking can be used to assist the programmer model. Specifically, if the answer generated by the program is an empty set, a structural tweaking function can be applied to the knowledge graph. For instance, modifications, or tweaks, to the knowledge graph can be proposed that are associated with reducing the probability of the answer being an empty set. This approach can, for example, automatically overcome training errors that could otherwise prevent the natural language processing model from producing answers that match the expected answer.

In some implementations, as indicated above, training the natural language processing model can include a first training stage and a second training stage. In the first training stage, the "code assist" function can be applied more frequently than the "structural tweaking" function is applied. This can be based on the assumption that the encoder model is performing better than the programmer model during the first training stage. In the second training stage, however, the "structural tweaking" function can be applied more frequently than the "code assist" function. This can be based on the assumption that the programmer model is performing better than the encoder model during the second training stage.

In some implementations, the systems and methods of the present disclosure adopt an approach that does not require a separate corpus or a restricted hidden sequence space. For example, in some implementations, the systems and methods of the present disclosure can use a less restricted hidden space by allowing both copied tokens and generated tokens (e.g., through a CopyNet). In some implementations, the decoder can be pre-trained with randomly generated hidden sequences, which include, for example, only tokens from the source sequence. In some embodiments, the perplexities of the pre-trained decoder can be used to guide the training of encoder. Additionally, in some implementations, Kullback-Leibler ("KL") divergence between the language model and the encoded sequences is not enforced or used, since, in some implementations, they are produced for NGM computations instead of human reading, and, thus, are not required to be in fluent English.

The systems and methods of the present disclosure can provide a number of technical effects and benefits. As one example, accurate answering of natural language questions based on natural language text can have many uses. For instance, it can be implemented to provide or improve a digital personal assistant program. In such an application, the natural language text body can be gathered from one or more of previous interactions with the personal assistant and/or from the internet, for example. An additional application can include parsing and extracting information from any large volume of natural language text, such as, for example, scientific research, medical research, news articles, etc. Additionally, as indicated above, in some implementations, the systems and methods disclosed herein can provide scalability for large volumes of text through symbolic storage of information. For instance, in some implementations the complexity of the knowledge graph is independent of the size of the knowledge graph. This can provide improvements to computing technology, including, for example, reduced storage requirements, reduced computational demands during operation, faster processing time, etc.

With reference now to the Figures, example embodiments of the present disclosure will be discussed in further detail.

Example Devices and Systems

FIG. 1A depicts a block diagram of an example computing system 100 that can be configured to implement or otherwise execute the systems and methods of the present disclosure. The system 100 can include a user computing device 102, a server computing system 130, and/or a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned natural language processing models 120. For example, the machine-learned natural language processing model(s) 120 can be or can otherwise include various machine-learned models such as neural networks or other multi-layer non-linear models. In some implementations, the neural networks can include recurrent neural networks (e.g., long short-term memory recurrent neural networks), sequence-to-sequence neural networks, feed-forward neural networks, or any other suitable form of neural networks. Example machine-learned natural language processing model(s) 120 are discussed with reference to FIGS. 2 and 3.

In some implementations, one or more machine-learned natural language processing model(s) 120 can be received from the server computing system 130 over a network 180, stored in the user computing device memory 114, and the used or otherwise implemented by the one or more processors 112. In some implementations, the user computing device 102 can implement multiple parallel instances of a single machine-learned natural language processing model 120 (e.g., to perform parallel processing of natural language questions across multiple instances of the machine-learned natural language processing models 120).

More particularly, in some implementations, the natural language processing model can be configured to answer a natural language question based on a natural language text body, such as a series of sentences forming a narrative or story. For example, the natural language question can be a search query and the natural language text body can include one or more web pages or other web documents identified during a web search. As another example, a single computing device such as, for example, a user computing device (e.g., smartphone, tablet, personal assistant device, etc.) can implement the natural language processing model 120 to answer natural language questions provided to the device by a user (e.g., in the style of a question posed to a personal assistant).

Additionally or alternatively, one or more machine-learned natural language processing models 140 can be included in or otherwise stored and implemented by the server computing system 130 that communicates with the user computing device 102 according to a client-server relationship. For example, the machine-learned natural language processing model(s) 140 can be implemented by the server computing system 140 as a portion of a web service (e.g., a personal assistant service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned natural language processing models 140. For example, the models 140 can be or can otherwise include various machine-learned models such as neural networks (e.g., recurrent neural networks) or other multi-layer non-linear models. Example models 140 are discussed with reference to FIGS. 2 and 3.

The server computing system 130 can train the models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a machine-learned natural language processing model 140 based on a set of training data 142. The training data 142 can include, for example, a natural language text body, a natural language question, and an expected answer. In some implementations, the natural language text body can include a series of sentences forming a narrative or story. Any suitable natural language text body can be included in the training data 142, however, as explained in greater detail below.

In some implementations, the natural language question included in the training data 142 can include a question associated with information contained within the natural language text body. The natural language question can be input by the user through the user input component 122 of the user computing device 102. For example, in some implementations, the user can dictate the natural language question to the user computing device 102. The user input component 122, which can include a microphone, can sense the user-dictated question and implement voice-recognition technology to convert the audio input into text. In other implementations, the user can input the natural language question in text through the user input component 122, which can include a virtual keyboard, for example.

The expected answer included in the training data 142 can include one or more words. In some implementations the expected answer can include at least one word also found in the natural language question and/or the natural language text body.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model. For instance, the training data 142 can include can be generated from one or more previous interactions between the user and the user computing device 102. For example, in some implementations, the natural language text body, natural language question, and/or natural language answer can include text previously input by the user. In another example, the natural language text body can include text gathered from web pages previously visited by the user using the user computing device 102.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
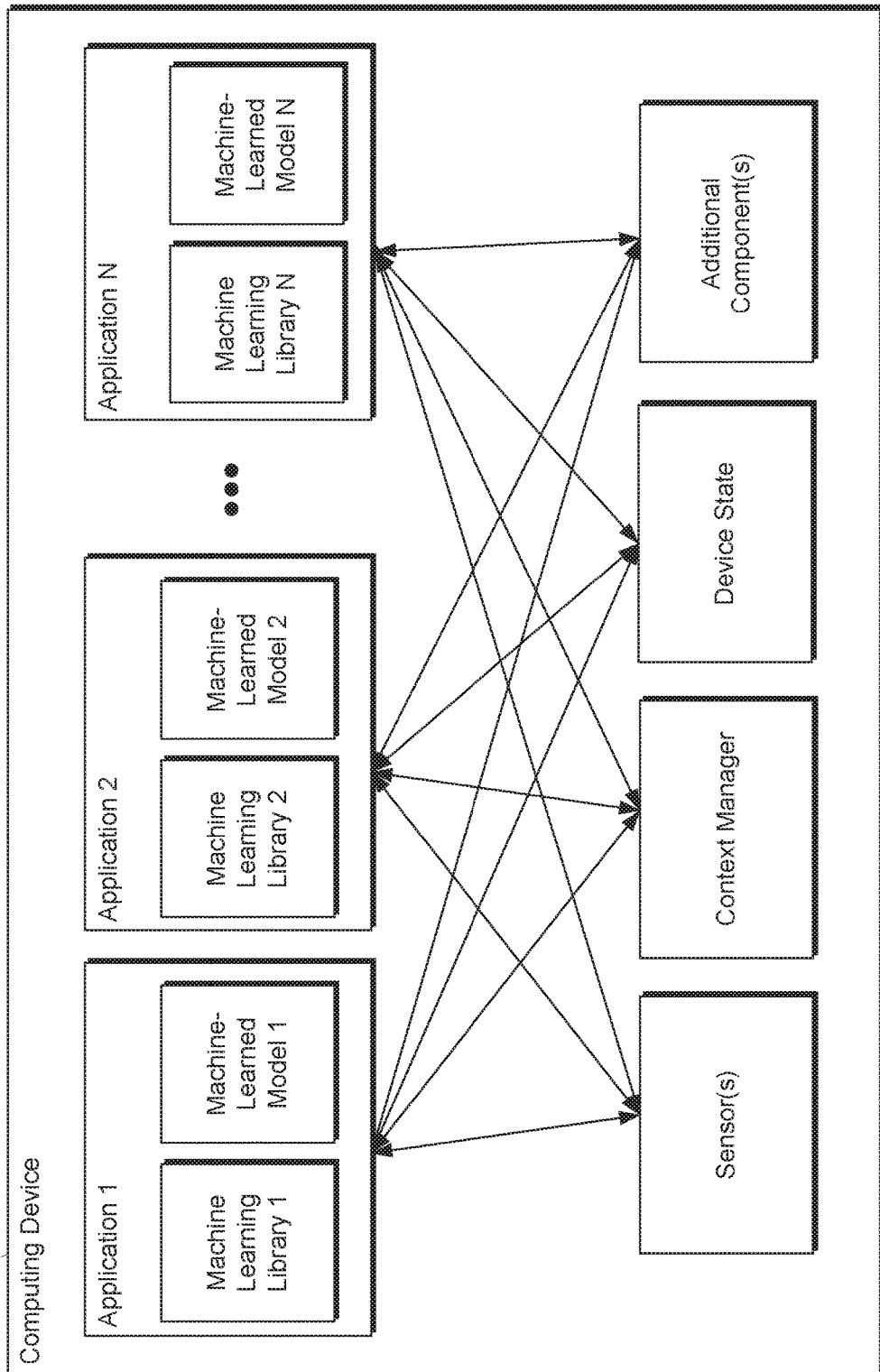
FIG. 1B depicts a block diagram of an example computing system that performs natural language processing according to example aspects of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
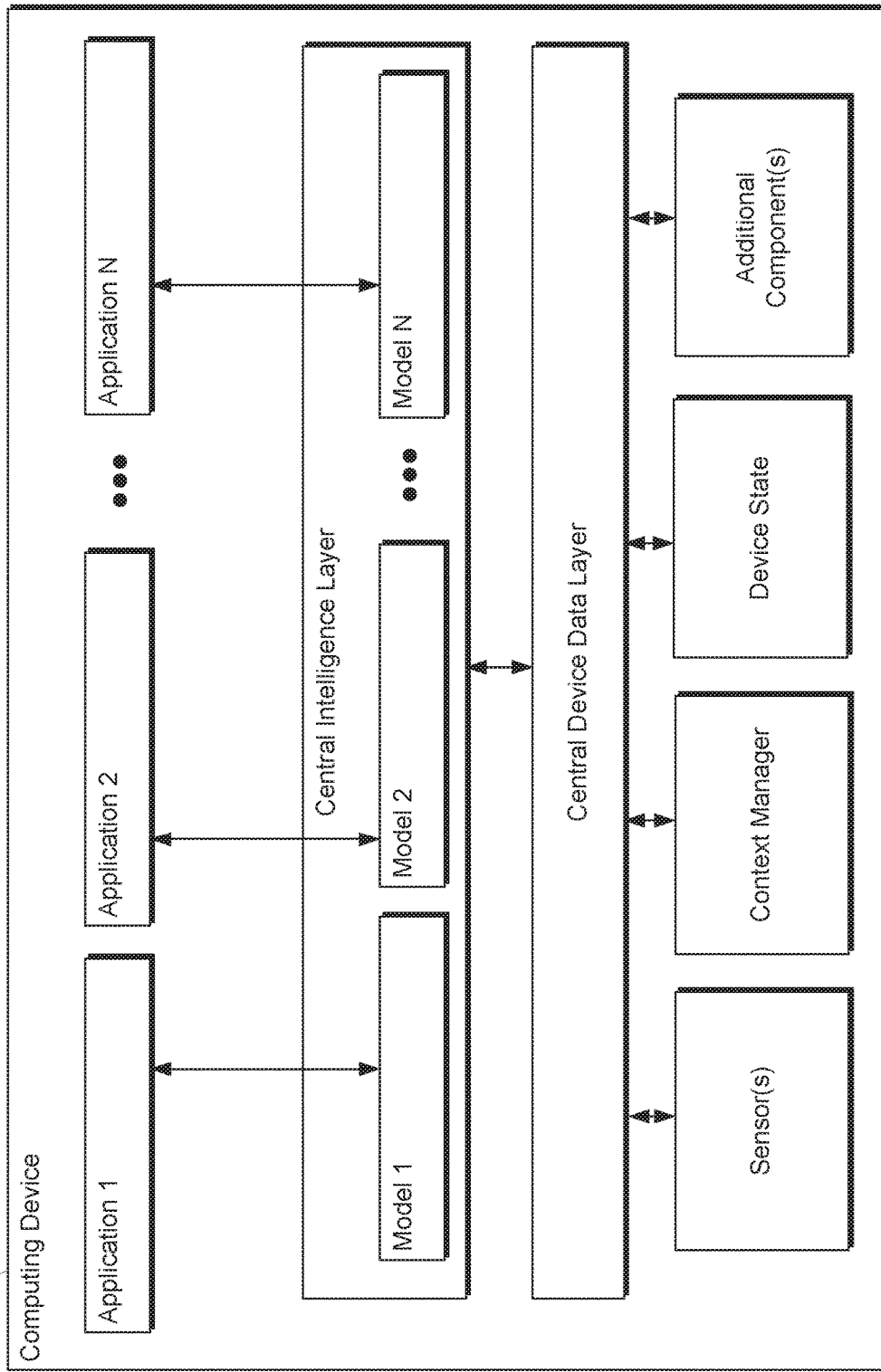
FIG. 1C depicts a block diagram of an example computing system that performs natural language processing according to example aspects of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangement

Figure 2:
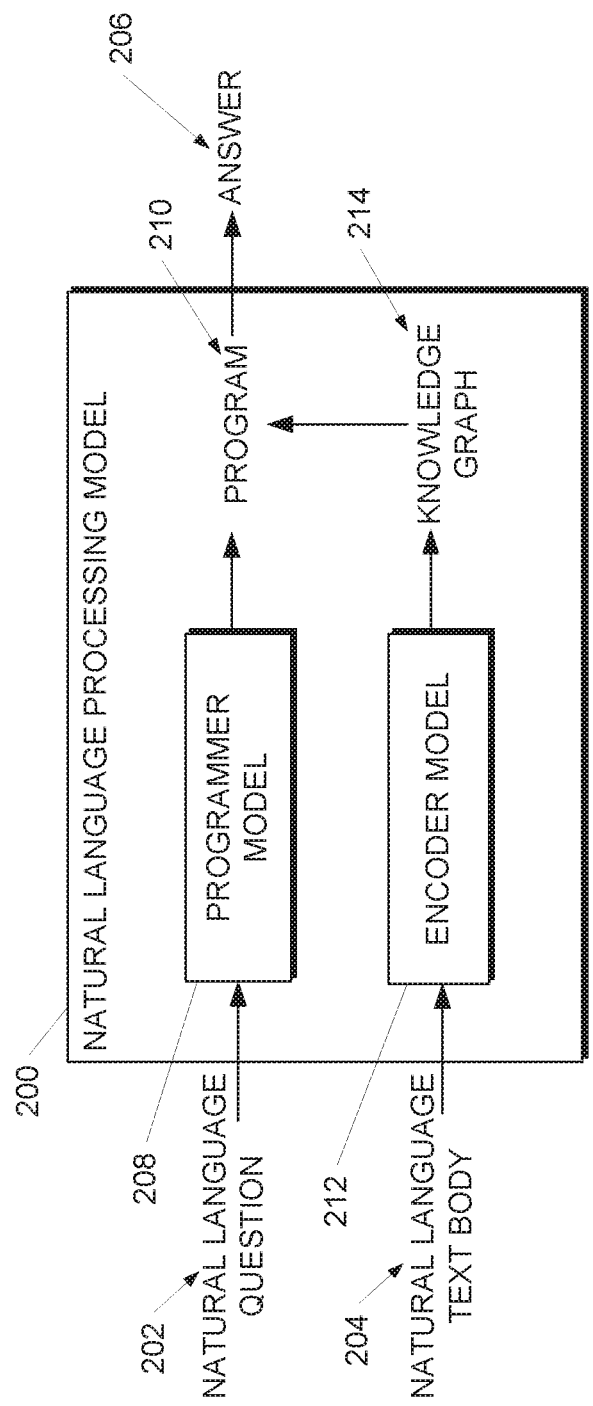
FIG. 2 depicts a block diagram of an example natural language processing model according to example aspects of the present disclosure.

FIG. 2 depicts a block diagram of an example machine-learned natural language processing model 200 according to example embodiments of the present disclosure. In some implementations, the machine-learned natural language processing model 200 is trained to receive a natural language question 202 and a natural language text body 204 and, as a result of receipt of the natural language question 202 and a natural language text body 204, provide an answer 206 to the natural language question 202.

In some implementations, the machine-learned natural language processing model 200 can include a programmer model 208 is trained to receive the natural language question 202, and, in response to receipt of the natural language question 202, output a program 210. In other implementations, the machine-learned natural language processing model 200 can include a query programming system configured to receive a natural language input query, and generate, using a machine-learned natural language query programmer model 208, a program 210 for querying the knowledge graph 214 based on the natural language input query. The natural language input query can include, for example, the natural language question 202.

In some implementations, the machine-learned natural language processing model 200 can include an encoder model 212 that is trained to receive a natural language text body 204 and, in response to receipt of the natural language text body 204, output a knowledge graph 214. In other implementations, the machine-learned natural language processing model 200 can include an encoding system that is configured to receive the natural language text body 204 and generate, using the machine-learned natural language encoder model 212, the knowledge graph 214 based on the natural language text body 204.

The program 210 can include a function that causes a search on the knowledge graph 214. For example, in some implementations, the program 210 can receive the knowledge graph 214 as an input and, in response, output the answer 206 to the natural language question 202. In other implementations, the machine-learned natural language processing model 200 can include a query execution system that is configured to execute the generated program 210 on the generated knowledge graph 214 and to output a query response that can include the answer 206.

In some implementations, the knowledge graph 214 can represent information that is contained with the natural language text body 204. For instance, the knowledge graph can include a series of word sequences, referred to as "n-grams" or "tuples," representing the information contained within the sentences. For instance, in some implementations, each n-gram sequence, or statement, can include two elements, e.g., words, referred to as a "bi-gram." In other implementations, each n-gram sequence can include three words, referred to as "tri-gram." In some implementations, each n-gram sequence can include greater than three words. In yet further implementations, each n-gram can include a different number of words (e.g., the knowledge graph can include bi-grams, tri-grams, or other n-grams, or combinations thereof). In some implementations, the number of elements in each n-gram can be a predetermined value. In other implementations, the number of elements can be selected, e.g., by the encoder model 212, based on characteristics of the natural language text body 204, such as the length of the sentences, complexity of the sentences, etc. Additionally, in some implementations, the knowledge graph 214 can include timestamps associated with the n-grams. For example, each n-gram can have an associated timestamp representative of the order that the associated portion of the natural language text body 204 appeared in the natural language text body 204. In some implementations, the encoder model 212 can be configured to generate respective timestamps in association with each of the plurality of n-gram statements. The timestamps can represent the order in which the n-gram statements are generated from the natural language text body. This can improve the ability of the knowledge graph 214 to represent chronological information that is contained in the natural language text body 204.

In some implementations, as indicated above, the program 210 output by the programmer model 208 can include a function that causes a search of the knowledge graph 214. For example, the function can be configured to search the knowledge graph 214 and locate one or more words contained within the knowledge graph 214 to answer the natural language question 202. One example function is "hop," which can be configured to locate each word in the knowledge graph 214 directly following its input, or argument. For example "hop Mary" executed on a knowledge graph 214 containing "Mary; Kitchen" can produce "Kitchen." Another example function is "argmax," which can operate in a similar manner as "hop" except that "argmax" can find the last instance within the set of words following the input, or argument. Similarly, "argmin" can find the first instance within the set of words following the input. Additional functions can be used. In some implementations, the program model 208 can be configured to create new functions and/or modify existing functions (Jürgen Schmidhuber, Optimal ordered problem solver, *Machine Learning*, 54(3): 211-254, 2004).

In some implementations, the program 210 output by the programmer model 306 can include a plurality of functions configured to operate together to provide the answer 206 to the natural language question 202. For instance, an example program 210 can contain a first function configured to locate a first variable, and a second function configured to locate the answer 206 to the natural language question 202 using the first variable as an input.

As indicated above, in some implementations, the natural language processing model can include a query execution system that is configured to execute the generated program 210 on the generated knowledge graph 214 and to output a query response that includes the answer 206. In some implementations, executing each function of the program 210 can cause the query execution system to discover at least one n-gram statement, a portion thereof, that includes the argument of the function. In some implementations, executing each function of the program 210 can cause the query executing system to return a variable based on the function and/or the at least one discovered n-gram statement.

Illustrative Example

The following simplified example illustrates the operation of one implementation of the natural language processing model 200 through sample inputs and sample outputs (e.g., the knowledge graph and program) of the various models 208, 212. As explained in greater detail in subsequent sections, the behaviors of the programmer model 208 and encoder model 212 can be learned through training. Accordingly, the sample inputs and output described below are merely illustrative. For instance, the encoder model 212 receiving the following natural language text body 202:

Bernard is a rhino.
Lilly is a swan.
Julius is a swan
Lily is white.
Greg is a rhino
Julius is white.
Brian is a lion
Bernard is gray.
Brian is yellow.

In response to receiving the natural language text body 202, the encoder model 212 can output a knowledge graph 214 that contains a series of n-grams, for example, tri-grams. As indicated above, the behavior of the encoder model 212 can be learned based on training data. Thus, the sample following knowledge graph 214 presented below is a merely an example of one potential output from the encoder model 212 in response to receiving the above natural language text body 204:

| Bernard | a  | rhino  |
|---------|----|--------|
| Lilly   | a  | swan   |
| Julius  | a  | swan   |
| Lily    | is | white  |
| Greg    | a  | rhino  |
| Julius  | is | white  |
| Brian   | a  | lion   |
| Bernard | is | gray   |
| Brian   | is | yellow |

In this example, the programmer model 208, in response to receiving the natural language question 202 "What color is Greg?" can output a program 210 that produces the correct answer. For instance, the program 210 can include one or more functions that cause one or more searches of the knowledge graph 214. As the behavior of the encoder model 212 is learned based on training data, the following is merely an example of one potential output from the programmer model 208.

| Hop  | Greg | a  |
|------|------|----|
| Hopp | var1 | a  |
| Hop  | var2 | is |

The above example program 210 contains three functions. The first function is "hop" and its input is "Greg" and "a." This first function can locate the next word or words following "Greg" and "a" in the knowledge graph 214: "rhino." The second function in the above sample program 210 is "hopp." In some implementations, "hopp" can be a function configured to locate the word or words immediately preceding its input, or argument. In this example, the second function can use the output set of the first function, "var1", as an input. Thus, the second function can locate words preceding "rhino" and "a" in the sample knowledge graph 214: "Bernard" and "Greg." The third function can then use the output set of the second function, "var2", as an input and locate words following "Bernard; is" and "Greg: is" in the knowledge graph 214: "gray." Thus, the sample program 210 can extract or otherwise select the correct answer from the sample knowledge graph 214.

Example Model Arrangements

Figure 3:
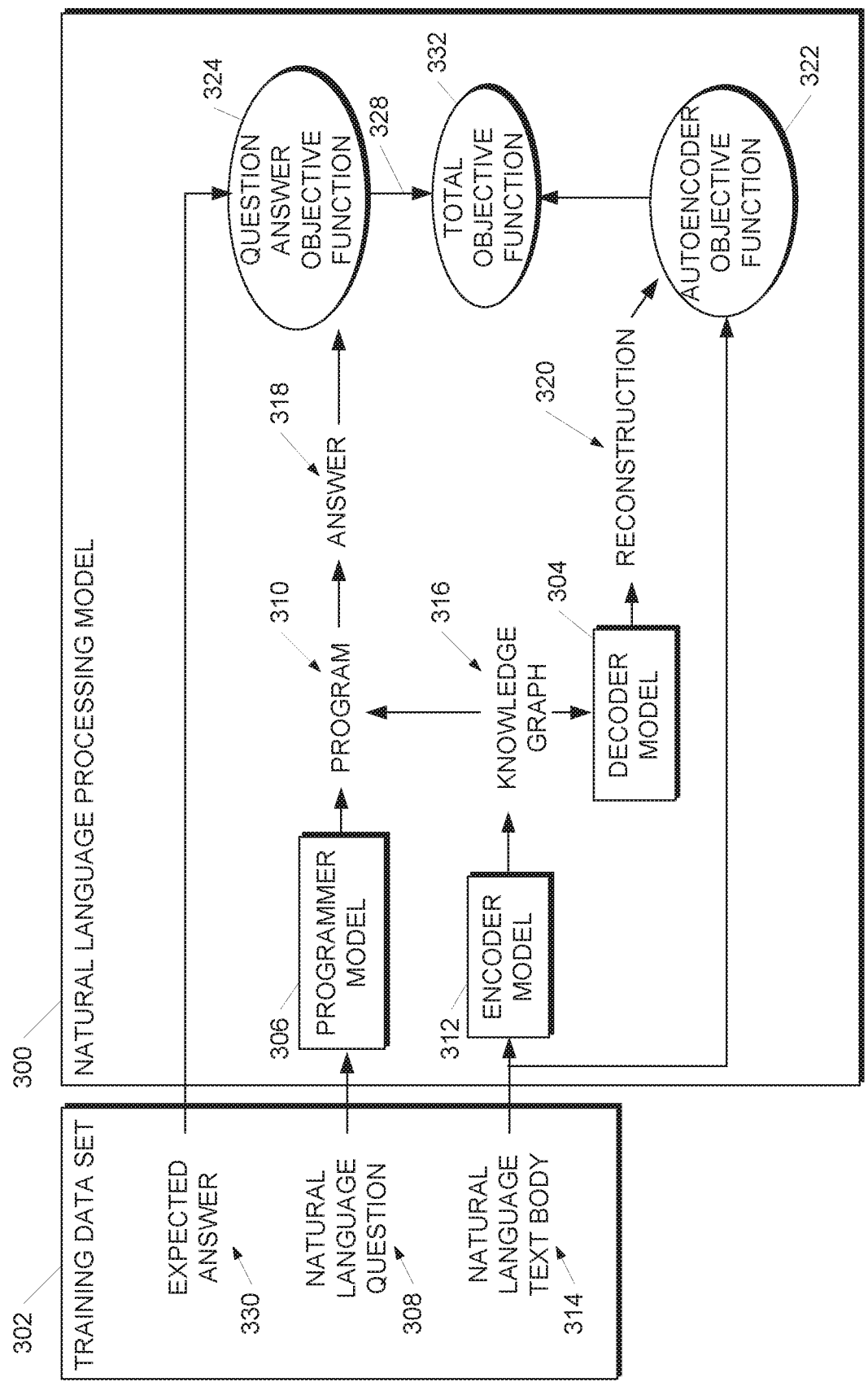
FIG. 3 depicts a block diagram of an example natural language processing model configured for training according to example aspects of the present disclosure.

FIG. 3 depicts a block diagram of an example natural language processing model 300 configured to receive a training data set 302 according to example embodiments of the present disclosure. The natural language processing model 300 is similar to the natural language processing model 200 of FIG. 2 except that the natural language processing model 300 further includes a decoder model 304, as explained in greater detail below. For example, in some implementations, the natural language processing model 300 is the same model as the natural language processing model 200, but FIG. 3 shows the model configuration used for training the model (e.g., at training time) while FIG. 2 shows the model configuration used for producing inferences from the model (e.g., at inference time).

The natural language processing model 300 can include a programmer model 306 configured to receive a natural language question 308 and output a program 310. The natural language processing model 300 can also include an encoder model 312 configure to receive a natural language text body 314 and output a knowledge graph 316. In some implementations, the knowledge graph 316 can represent information that is contained with the natural language text body 204. The program 310 can be executed on the knowledge graph 316 (e.g., receive the knowledge graph 316 as an input) to produce an answer 318 to the natural language question 308.

As indicated above, the natural language processing model 300 can be configured for training and can include the decoder model 304. The decoder model 304 can be configured to receive the knowledge graph 316 and, in response to receipt of the knowledge graph 316, output a reconstruction 320 of the natural language text body 314. When combined, the encoder model 306 and the decoder model 304 can operate as, or otherwise be trained in, the style of an autoencoder. For example, in some implementations, an autoencoder objective function 322 can describe a reconstruction loss between the natural language text body 314 and the reconstruction 320 of the natural language text body 314. For example, in one implementation, the autoencoder objective function 322 can be indicative of the likelihood that each n-gram of the knowledge graph 316 contains the information contained within a respective sentence of the natural language text body 314. In some implementations, the autoencoder objective function 322 can describe an encoder probability distribution that describes an input of the encoder model 312 with respect to an output of the encoder model 312. For example, in some implementations the encoder probability distribution can be defined as:

$$P(t|s;\theta_{enc}) \tag{1}$$

where t represents the tuples (e.g., n-grams), contained within the knowledge graph 316; s represents the sentences contained within the natural language text body 314; and $\theta_{enc}$ represents the encoder model 312. In some implementations the encoder probability distribution can be indicative of the likelihood that the information contained in each sentence is contained within the individual n-grams of the knowledge graph 316. In some implementations, the encoder probability distribution can be used to calculate a knowledge graph distribution indicative of the likelihood that the information contained in the sentences is contained within the knowledge graph 316. In some embodiments the knowledge graph distribution can be calculated as follows:

$$P(kg \mid s; \theta_{enc}) = \prod_{s \in S} P(t_{kg}(s) \mid s; \theta_{enc}) \tag{2}$$

where kg represents the knowledge graph 316; t represents the tuples (e.g., n-grams), of the knowledge graph 316; and s represents the sentences contained within the natural language text body 314. In some implementations, the encoder model 312 can be configured to output the encoder probability distribution, or a component thereof. In other implementations, any suitable component of the natural language processing model 300 can be configured to produce the encoder probability distribution.

In some implementations, the autoencoder objective function 322 can describe a decoder probability distribution that describes an input of the decoder model 304 with respect to an output of the decoder model 304. For example, in some implementations the decoder probability distribution can be defined as:

$$P(s|t;\theta_{dec}) \quad (3)$$

where t represents the tuples contained within the knowledge graph 316, and $\theta_{dec}$ represents the decoder model 304. Thus, in some implementations, the decoder probability distribution can be indicative of the likelihood that the information contained within each tuple (e.g., n-gram) of the knowledge graph 316 contains the information contained within the sentences of the knowledge graph 316. In some implementations, the decoder model 304 can be configured to output the decoder probability distribution, or a component thereof. In other implementations, any suitable means can be used to calculate the decoder probability distribution.

In some implementations, the autoencoder objective function 322 can be defined as a function of the encoder probability distribution and the decoder probability distribution. For instance, in one implementation, the autoencoder objective function 322 can be defined as follows:

$$O^{AE}(\theta_{enc}, \theta_{dec}) = \sum_{kg} (\beta + P(kg | s; \theta_{enc})) \sum_{(s,t) \in (s,kg)}, \log(P(s | t, \theta_{dec})) \quad (4)$$

where β can be a smoothing variable.

In some implementations, the question answer objective function 324 can describe a reward 328 that is based on a comparison of the answer 318 and an expected answer 330 included in the training data set 302. The reward 328 can be represented as follows:

$$R(kg, prog, a) \quad (5)$$

where kg represents the knowledge graph 316; prog represents the program 310; and a represents the expected answer 330.

In some implementations, the question answer objective function 324 can describe a programmer probability distribution that describes an input of the programmer model 306 with respect to an output of the programmer model 306. In some implementations, the programmer model 306 can be configured to output a set of programs 310 and a set of respective weights. Each weight can be associated with a respective program 310 and can represent the expected likelihood that the respective program will generate the expected answer when executed on the natural language text body. In some implementations, the plurality of weights can be used to select a program from the plurality of programs to execute on the knowledge graph to produce an answer which is output by the natural language processing model. In some implementations, the programmer probability distribution can be represented as follows:

$$P(prog|q;\theta_{prog}) \quad (6)$$

where q represents the natural language question 308; prog represents the set of programs 310; and $\theta_{prog}$ represent the programmer model 306. In some implementations, the programmer model 306 can be configured to output the programmer probability distribution, or a component thereof. In other implementations, any suitable component of the natural language processing model 300 can be configured to calculate or output the programmer probability distribution.

In some implementations, the question answer objective function 324 can describe the encoder probability distribution, explained above with reference to the autoencoder objective function 322. Thus, in some implementations, the question answer objective function 324 can be defined as follows:

$$O^{QA}(\theta_{enc}, \theta_{prog}) = \sum_{kg} \sum_{prog} P(kg | s; \theta_{enc}) P(prog | q; \theta_{prog}) R(kg, prog, a) \quad (7)$$

In some implementations, a total objective function 332 can include the question answer objective function 324 and the autoencoder objective function 322. For example, in some implementations, the total objective function 332 can include a summation of the question answer objective function 324 and the autoencoder objective function 322:

$$O(\theta_{dec},\theta_{enc},\theta_{prog}) = O^{AE}(\theta_{enc},\theta_{dec}) + O^{QA}(\theta_{enc},\theta_{prog})$$

where $O(\theta_{dec},\theta_{enc},\theta_{prog})$ represents the total objective function 332; $O^{AE}(\theta_{enc},\theta_{dec})$ represents the autoencoder objective function 322; and $O^{QA}(\theta_{enc},\theta_{prog})$ represents the question answer objective function 324.

In some implementations, the definition of the autoencoder objective function can be transitioned during training from a first autoencoder objective function in a first training stage to a second autoencoder objective function in a second training stage. In the first training stage, the first autoencoder objective function can be defined, as described above, to describe the reconstruction loss between the natural language text body 314 and the reconstruction 320 of the natural language text body 314. For instance, the first autoencoder objective function can be defined according to Equation (4), above. In contrast, during the second stage, the second autoencoder objective function can describe the reward 328 that is based on the comparison of the answer 318 and the expected answer 330. For example, in some implementations, during the second stage, the autoencoder objective function 322 can be defined in a similar manner as the question answer objective function 324:

$$O^{AE}_{2nd}(\theta_{enc}, \theta_{prog}) = \sum_{kg} \sum_{prog} P(kg | s; \theta_{enc}) P(prog | q; \theta_{prog}) R(kg, prog, a) \quad (9)$$

In some implementations, the autoencoder objective function can be transitioned from the first autoencoder objective function to the second autoencoder objective function based on the performance of the encoder model. For example, in some implementations, the autoencoder objective function can be transitioned once the first autoencoder objective function is less than a predetermined threshold value. The predetermined threshold value can be selected such that satisfying the above-described condition is indicative of the knowledge graph containing a sufficiently accurate representation of the information within the natural language text body. At such a point, the natural language processing model 300 can be configured to transition from the first autoencoder objective function to the second autoencoder objective function. For example, this can more effectively train the encoder model 312 to encode the information from the natural language text body 314 into the knowledge graph 316 in a manner that better facilitates correctly answering the natural language question 308.

Additionally, in some implementations, training the natural language processing model 300 can include alternating, e.g., using a coordinate ascent approach, between (1) jointly training the encoder and decoder models 312, 304 using the autoencoder objective function 322, and (2) training the programmer model 306 using the question answer objective function 324. In other implementations, training the natural language processing model 300 can include alternating between training each model 304, 306, 312 based on one or more respective objective functions associated with one or more of the respective models 304, 306, 312.

Thus, in some implementations, one or more of the encoder model 312, the decoder model 304, and the programmer model 306 can have a respective objective function. For instance, a decoder objective function of the decoder model 304 can be defined as $$O(\theta_{dec}) = \sum_{(s,t) \in (s,kg)} \log(P(s \mid t; \theta_{dec})) \tag{10}$$

and the gradient of the decoder objective function can be defined as follows:

$$\sum_{s \in S} \sum_{t \in \mathbb{T}_s} \nabla_{\theta_{dec}} \log P(s \mid t; \theta_{dec}) \tag{11}$$

In some implementations, the decoder model 304 can be pre-trained (e.g., before the jointly training the encoder and decoder models 312, 204 as described above). For example, the decoder model 304 can be pre-trained using an input training data and output training data that is randomly generated from the input training data.

Similarly, the first and second autoencoder objective functions can have associated first and second encoder objective functions that can be used to perform training (e.g., in alternation). For instance, the first encoder objective function of the encoder model 312 can be defined as $$O(\theta_{enc}) = \sum_{t \in \mathbb{T}_s} \log P(t \mid s, \theta_{enc}) g(\log P(s \mid t, \theta_{dec})) \tag{12}$$

where $g: \mathbb{R} \to [0,1]$ can be a non-decreasing function. The gradient of the first encoder objective function can be defined as follows:

$$\sum_{t \in \mathbb{T}_s} \nabla_{\theta_{enc}} \log P(t \mid s, \theta_{enc}) g(\log P(s \mid t, \theta_{dec})) \tag{13}$$

The second autoencoder objective function can be defined as $$O(\theta_{enc}) = \sum_{kg} \sum_{prog} P(kg \mid s; \theta_{enc}) P(prog \mid q; \theta_{prog}) R(kg, prog, a) \tag{14}$$

and the gradient of the second autoencoder objective function can be defined as follows:

$$\sum_{kg} \nabla_{\theta_{enc}} \log P(kg \mid s; \theta_{enc}) \cdot w_{kg} \sum_{prog} P(prog \mid q; \theta_{prog}) R(kg, prog, a) \tag{15}$$

Additionally, the programmer model 306 can have an associated programmer objective function, which can be defined as $$O(\theta_{prog}) = \sum_{kg} \sum_{prog} P(kg \mid s; \theta_{enc}) P(prog \mid q; \theta_{prog}) R(kg, prog, a) \tag{16}$$

and have a gradient defined as follows:

$$\sum_{prog} \nabla_{\theta_{prog}} \log P(prog \mid q; \theta_{prog}) \cdot w_{prog} \tag{17}$$

$$\sum_{kg} P(kg \mid s; \theta_{enc}) R(kg, prog, a)$$

In some implementations, training of the encoder model 312 can be guided based on information collected during the pre-training of the decoder model 304. Additionally, in some implementations, one or more compressor models may be incorporated or otherwise leveraged to further improve the performance of the autoencoder (e.g., the decoder model 304 and encoder model 312) (see e.g., Miao et al. Language as a Latent Variable: Discrete Generative Models for Sentence Compression, in the 2016 *Conference on Empirical Methods in Natural Language Processing (EMNLP)*, arXiv: 1609.07317v2, 2016).

As indicated above, in some embodiments, one or more of the above objective functions can be used to train the various models 304, 306, 312. For example, the various gradient functions described above can be calculated at each training iteration and used to determine how best to adjust the various parameters of each respective model 304, 306, 312. For example, the gradient functions can be used to minimize the respective objective functions to train the models 304, 306, 312.

Example Methods

Figure 4:
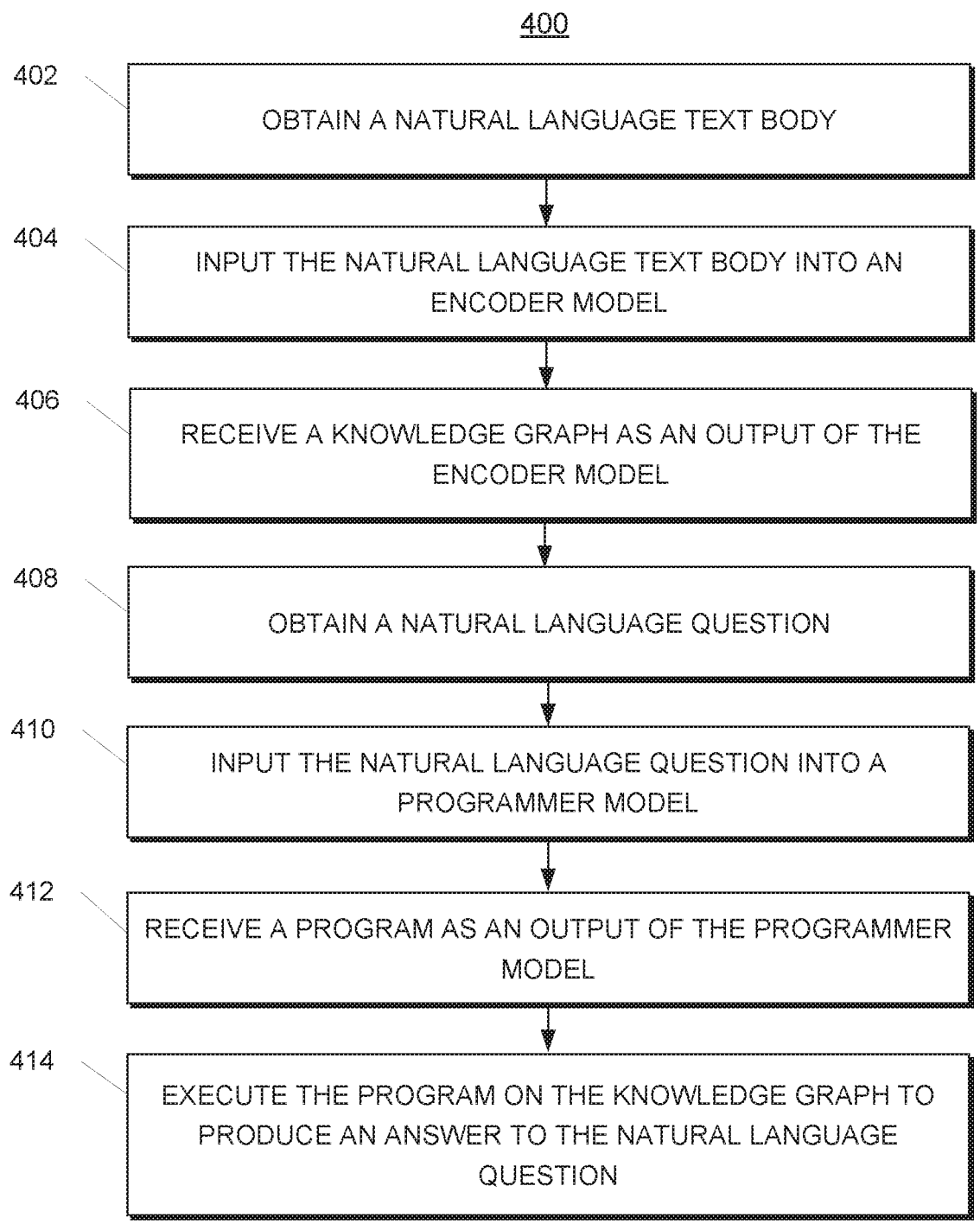
FIG. 4 depicts a flow chart diagram of an example method to determine an answer to a natural language question based on a natural language text body according to example aspects of the present disclosure.

FIG. 4 depicts a flow chart diagram of an example method 400 according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At (402), a computing system can obtain a natural language text body. For example, a user can enter the natural language text body into a user computing system (e.g., a user computing device) to provide the natural language text body to the natural language processing model. In other implementations, the natural language processing model can independently obtain the natural language text body from an external source, such as one or more websites related to the natural language question, for example.

At (404), the computing system (e.g., the server computing device and/or the user computing device) can input the natural language text body into the encoder model. For example, the encoder model can include a trained neural network, for example a recurrent neural network. The encoder model can be trained to receive a natural language text body and, in response to receipt of the natural language text body, output a knowledge graph. At (406), the computing system can receive the knowledge graph as an output of the encoder model. In some implementations, the knowledge graph can store at least some of the information contained within the natural language text body. For instance, the knowledge graph can contain a plurality of n-grams (e.g., bi-grams, tri-grams, etc.). In some embodiments, the n-grams can semantically represent at least some of the information contained within the natural language text body.

At (408), the computing system can obtain a natural language question. For example, the user can enter the natural language question into the user computing system (e.g., the user computing device) such that the natural language question is provided to the natural language processing model. For instance, the user can dictate or manually enter the natural language question into the user computing system using a user input component.

At (410), the computing system can input the natural language question into a programmer model. In some implementations, the programmer model can be trained to receive the natural language question and output a program in response. For instance, in some implementations, the programmer model can be a trained neural network, such as a recurrent neural network. At (412), the computing system can receive a program as an output of the programmer model.

At (414), the computing system can execute the program on the knowledge graph to produce an answer to the natural language question. In some implementations, the program output by the programmer system can include a function that causes a search of the knowledge graph. For instance, the program can include a plurality of functions that work together to locate a word within the knowledge graph that answers the natural language question.

Figure 5:
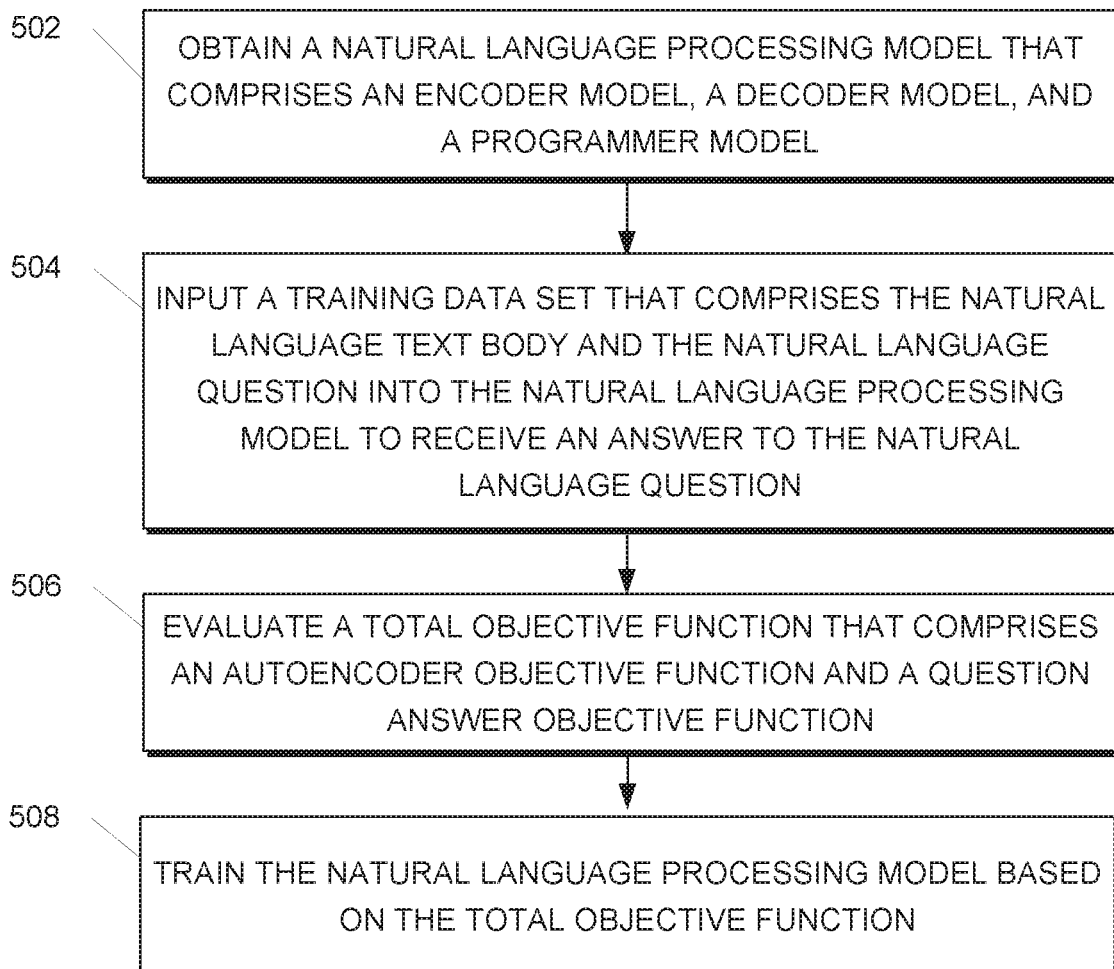
FIG. 5 depicts a flow chart diagram of an example method to train a natural language processing model according to example aspects of the present disclosure.

FIG. 5 depicts a flow chart diagram of an example method 500 for training a natural language processing model according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At (502), the computing system can obtain a natural language processing model that includes an encoder model, a decoder model, and a programmer model. For example, one or more of the models can be stored at the user computing device and/or at the server computing system. In some implementations, for instance, a training computer system can obtain the models from the user computing device and/or server computing system. Obtaining the natural language processing model can include any suitable manner of deploying the natural language processing model in an operative configuration.

At (504), the computing system can input a training data set that includes the natural language text body and the natural language question into the natural language processing model to receive an answer to the natural language question. For example, the training data set can include one or more natural language text bodies and/or one or more natural language questions. Additionally, in some embodiments, the training data set can also include one or more expected answers. For instance, in one embodiments, the training data set can include a plurality of expected answers that includes a respective correct answer for each of the natural language questions included in the training data set.

At (506), the computing system can evaluate a total objective function that includes an autoencoder objective function and a question answer objective function. In some embodiments, evaluating the total objective function can include summing the autoencoder objective function and the question answer objective function. In some embodiments, the autoencoder objective function can describe an encoder probability distribution that describes an input of the encoder model with respect to an output of the encoder model and/or a decoder probability distribution that describes an input of the decoder model with respect to an output of the decoder model. In some implementations, the autoencoder objective function can describe a reward that is based on a comparison of the answer received at (504) and the expected answer. For instance, in some implementations, the autoencoder objective function can be defined as explained above with reference to one or more of Equations (1)-(4) and (9).

In some implementations, the question answer objective function can describe the reward that is based on a comparison of the answer and the expected answer that is included in the training data set. In some implementations, the question answer objective function can describe the encoder probability distribution. For instance, in some implementations, the question answer objective function can be defined as explained above with reference to one or more of Equations (5)-(7).

At (508), the computing system can train the natural language processing model based on the total objective function. For example, the computing system can calculate the gradient of the total objective function, or respective gradients of one or more components thereof, to determine how to adjust the various model parameters to reduce the total objective function or one or more components thereof. For example, in some embodiments, the computing system can alternate between (1) jointly training the encoder and decoder models using the autoencoder objective function, and (2) training the programmer model using the question answer objective function. In other embodiments, the computing system can alternate between training each of the encoder model, decoder model, and programmer model using respective objective functions associated with each model. For instance, the computing system can use one or more of the respective objective functions described as explained above with reference to Equations (10)-(17).

Figure 6:
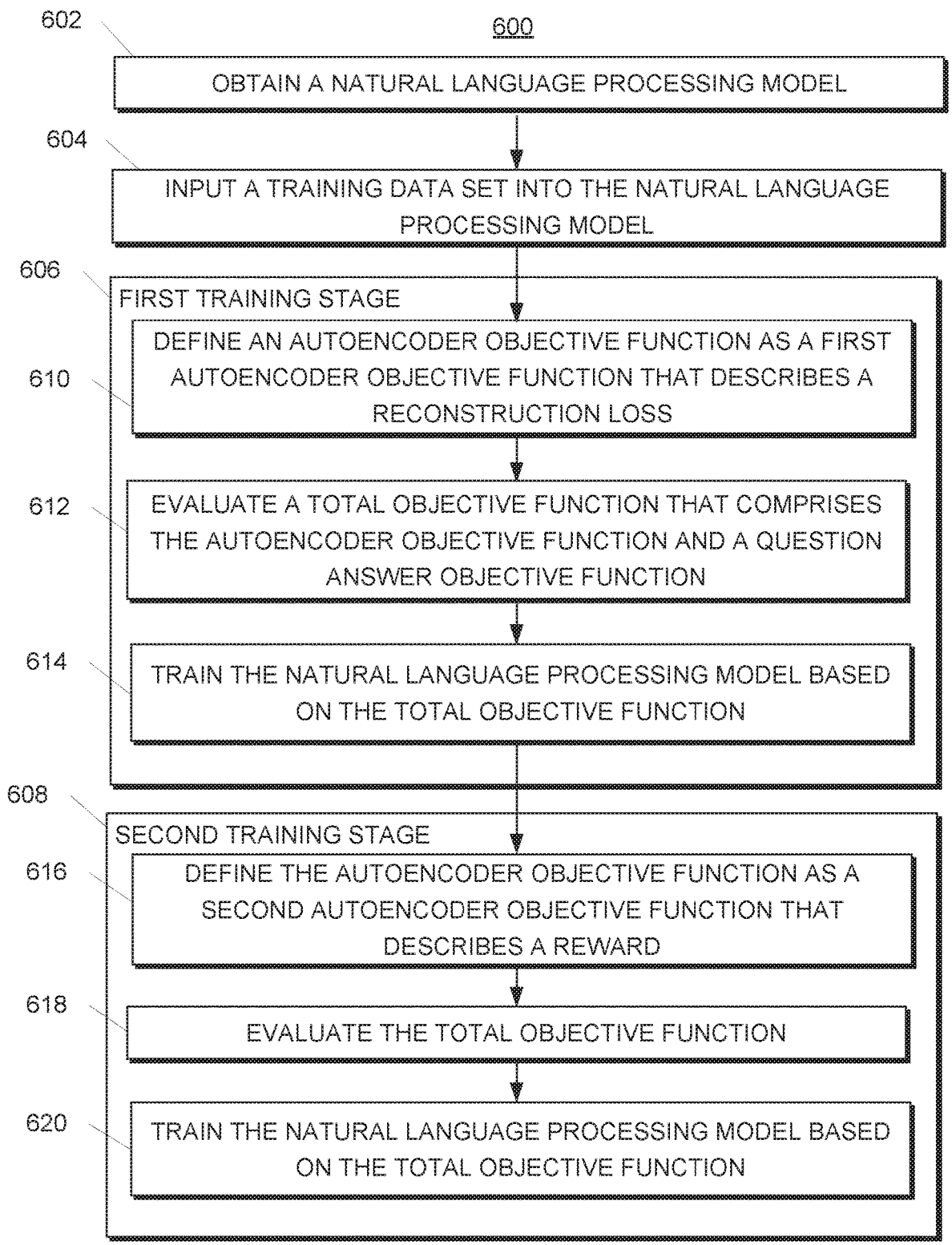
FIG. 6 depicts a flow chart diagram of a particular implementation of the method depicted in FIG. 5 according to example aspects of the present disclosure.

FIG. 6 depicts a flow chart diagram of an example method 600 for training a natural language processing model according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At (602), the computing system can obtain a natural language processing model that includes an encoder model, a decoder model, and a programmer model, for example, as described with reference to FIGS. 3 and/or 5.

At (604), the computing system can input a training data set that includes the natural language text body and the natural language question into the natural language processing model to receive an answer to the natural language question, for example as described with reference to FIGS. 3 and/or 5.

In some implementations, method 600 can include a first training stage 606 and a second training stage 608. In some implementations, the definition of the autoencoder objective function can be transitioned during training from a first autoencoder objective function in the first training stage 606 to a second autoencoder objective function in the second training stage 608, for example in greater detail below.

At (610), the computing system can define an autoencoder objective function as a first autoencoder objective function that describes a reconstruction loss. In some implementations, the computing system can be configured to generate, using the machine-learned natural language decoder model, a reconstruction of the natural language text body based on the knowledge graph. In some implementations, the computing system can calculate the reconstruction loss between the natural language text body and the reconstruction of the natural language text body. The reconstruction loss, for example, can be based on a comparison between the natural language text body and the reconstruction of the natural language text body that is output by the decoder model based on the knowledge graph. In some implementations, for example, the first autoencoder objective function can be defined as explained above with reference to Equation (7).

At (612), the computing system can evaluate a total objective function that comprises the autoencoder objective function and a question answer objective function, for example, in a similar manner as described above with reference to and FIGS. 3 and/or 5. For example, in some implementations, the total objective function can be calculated as the sum of the autoencoder objective function and the question answer objective function. At (614), the computing system can train the natural language processing model based on the total objective function, for example, in a similar manner as described with reference to and FIGS. 3 and/or 5. In some implementations, training the natural language processing model can include alternating between training one or more of the models included in the natural language processing model, for example, using one or more of Equations (10)-(17).

In some implementations, the computing system can repeat (610), (612), and/or (614) during the first training stage 606. For example, the computing system can perform multiple iterations to reduce the total objective function and/or one or more components thereof. In some embodiments, the computing system can utilize multiple natural language questions and/or multiple natural the natural language text bodies in the first training stage 606. For instance, the computing system can perform multiple iterations for each natural language question and/or natural language text body. During the first stage, the programmer model can receive multiple natural language question(s) and output one or more programs, and the encoder model can receive one or more natural language text bodies and output one or more knowledge graphs.

In some implementations, the computing system can transition from the first training stage 606 to the second training stage 608 based, in part, on the performance of the encoder model. For example, in some implementations, the autoencoder objective function can be indicative of the performance of the encoder model such that once the autoencoder objective function falls below a predetermined threshold, the computing system can transition to the second training stage 608. In other implementations, the computing system can transition from the first training stage 606 to the second training stage 608 based, in part, on a comparison between the reconstruction output by the decoder and the natural language text body. In other implementations, the computing system can transition from the first training stage 606 to the second training stage 608 based, in part, on the number of training iterations completed and/or the size of the training set. For instance, in some implementations, the computing system can consider the size, number, and/or complexity of the natural language text bodies and/or natural language questions. In other implementations, the transition can be based, in part, on receiving one or more correct answers to the natural language question.

In the second training stage 608, the computing system can define the autoencoder objective function as a second autoencoder objective function that describes a reward. For instance, in some embodiments, the autoencoder objective function can be defined as explained above with reference to Equation (9). During the second training stage 608, for example, the encoder model can be trained to encode the information from the natural language text body into the knowledge graph in a manner that improves the ability of the natural language processing model to correctly answering the natural language question. The second training stage 608 can also include evaluating the total objective function, at (618), in a manner similar to described above. The second training stage 608 can also include training the natural language processing model based on the total objective function, at (620), in a manner similar to described above.

In some implementations, in the first training stage 606, the autoencoder objective function can be defined as a weighted combination, e.g., summation, of the first and second autoencoder objective functions. For instance, in the first training stage 606, a first weight associated with the first autoencoder objective function can be greater than a second weight associated with the second autoencoder objective function. As the first training stage 606 progresses, the first weight can be gradually reduced and/or the second weight gradually increased. This can cause the autoencoder objective function to gradually transition from primarily describing the first autoencoder objective function in the first training stage 606 to primarily describing the second autoencoder objective function in the second training stage 608. In some implementations, in the second training stage 608, such weights can be further adjusted to continue such a gradual transition, until, for example, the autoencoder objective function is defined as the second autoencoder objective function, such as Equation (9).

In other implementations, however, the definition of the autoencoder objective function can change immediately at the end of the first training stage 606 and without a gradual transition. For instance, the autoencoder objective function can be defined according to a first autoencoder objective function (such as Equation (4)) in the first training stage 606, and as a second autoencoder objective function (such as Equation (9)) in the second training stage 608.

Figure 7:
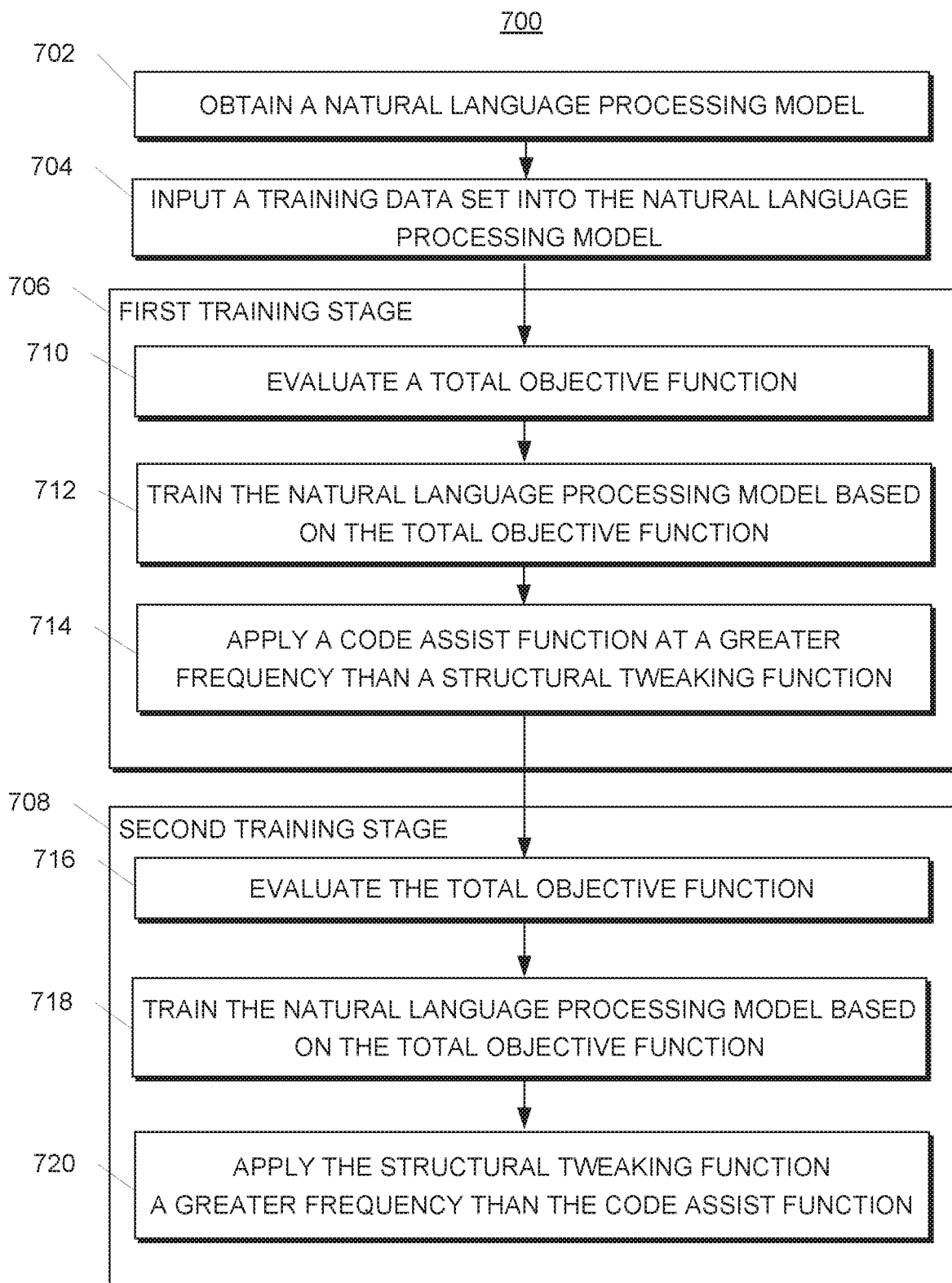
FIG. 7 depicts a flow chart diagram of another particular implementation of the method depicted in FIG. 5 according to example aspects of the present disclosure.

FIG. 7 depicts a flow chart diagram of an example method 700 for training a natural language processing model according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

The method 700 can include, at (702), obtaining a natural language processing model in a manner similar to described above. The method 700 can include, at (704), inputting a training data set into the natural language processing model in a manner similar to described above, for example.

The method 700 can include a first training stage 706 and a second training stage 708. Each of the first and second training stages 706, 708 can include evaluating a total objective function, at (710) and (716), for example as described above. Each of the first and second training stages 706, 708 can also include training the natural language processing model based on the total objective function, at (712) and (716), for example as described above.

During the first training stage 706, the method can include applying a code assist function (see, e.g., Liang, et al. Neural Symbolic Machines: Learning Semantic Parsers on Freebase with Weak Supervision, *Proceedings of the 55th Annual Meeting of the Association for Computational Linguistics, Vol. 1: Long Papers*, pages 23-33) at a greater frequency than a structural tweaking function. For instance, in some implementations, in the first training stage 706, the computing system can apply the code assist function at a first frequency and apply the structural tweaking function at a second frequency that is less than the first frequency. In other implementations, the second frequency can be zero in the first training stage 706. In other words, in some implementations, the natural language processing model may not apply the structural tweaking function whatsoever in the first training stage.

Applying the code assist function can include providing the programmer model with a set of potential functions from which the programmer model can select functions used to compile a program. In some implementations, the code assist function can generate the set of potential functions based, at least in part, on syntax rules associated with the potential functions (e.g., function A can only follow functions C or E). The code assist function can effectively reduce or eliminate the potential for execution errors when the program is executed. For instance, the potential functions provided to the programmer model can be based, in part, on the last function included in the program. In some implementations, the code assist function can effectively reduce the size of the search space for the programmer model, which can result in more efficient training.

During the second training stage 708, the method can include applying the structural tweaking function at a greater frequency than the code assist function. In some implementations, the structural tweaking function can be associated with reducing the probability of the answer comprising an empty set. For example, in some implementations, the method can include detecting if the answer comprises an empty set, and when such a condition is detected, applying, the structural tweaking function to the knowledge graph. In some implementations, applying the structural tweaking function can include examining the execution of the program on the knowledge graph, for example, on a function-by-function basis. For instance, if the program includes four functions that operate in series, for example as described above, the structural tweaking function can examine respective intermediate products of each of the functions included in the program. The structural tweaking function can determine which function caused the answer to include an empty set. The structural tweaking function can propose changes to the knowledge graph to reduce the likelihood that the program will generate an answer that includes an empty set.

In some implementations, a query programming system, in response to receiving an empty result returned by a query execution system for a function of the program, can be configured to provide an encoding system with at least one instruction to modify the knowledge graph. For instance, the instructions can indicate at least one modification to the knowledge graph that would reduce the probability of an answer that includes an empty set.

In some implementations, the transition from the first training stage 706 to the second training stage 708 can be based on the performance of the encoder model, in a manner similar to the description above referring to FIG. 6. In some implementations, the first training stage 706 can include gradually increasing the rate at which the structural tweaking function is applied and/or reducing the rate at which the code assist function is applied. Similarly, the second training stage 708 can include gradually increasing the rate at which the code assist function is applied and/or reducing the rate at which the structural tweaking function is applied.

Additionally, in some implementations a "REINFORCE" algorithm can be used to train the natural language processing model or one or more components thereof (Liang, et al. Neural Symbolic Machines: Learning Semantic Parsers on Freebase with Weak Supervision, *Proceedings of the 55th Annual Meeting of the Association for Computational Linguistics, Vol. 1: Long Papers*, pages 23-33; Ronald J. Williams, Simple statistical gradient-following algorithms for connectionist reinforcement learning, In *Machine Learning*, pages 229-256, 1992; Wojciech Zaremba and Ilya Sutskever, Reinforcement learning neural turing machines, *arXiv preprint arXiv:* 1505.00521, 2015).

Example Algorithms

The following algorithms are illustrative only and represent example possible implementations of the system and methods disclosed herein. As indicated above, in some implementations, an encoder model and decoder model can operate as, or otherwise be trained in, the style of an autoencoder. In some implementations, the following example algorithm can be used to train the encoder model and the decoder model.

Example Algorithm 1 Autoencoder Training

```
Input: Examples (s, q, a), models θ_enc and θ_dec, a non-decreasing function g: ℝ → [0,1].
1:   for s_i ∈ s do
2:       D_ML ← enumerated knowledge tuples {(t_1, s_i), ... , (t_N, s_i)}
3:       Maximum likelihood update θ_dec with D_ML
4:       Computer r_j for each {(t_j, s_i)} where r_j = logP(s_i|t_j, θ_dec)
5:       D_RL ← {(s_i, t_j, 1., g(r_j))}
6:       REINFORCE update θ_enc with D_RL
7:   end for
```

In some implementations, training of the various models can be accomplished using a training data set. The following example algorithm can be used to prepare the training data set, the encoder model, the programmer model, knowledge graphs, and programs.

Example Algorithm 2 Prepare Datasets

Input: Models $\theta_{enc}$ and $\theta_{prog}$, example (s, q, a), knowledge graphs $\mathcal{K}$, programs $\mathcal{P}$.
Initialize: $D_{kgRL} \leftarrow \emptyset$ $D_{progRL} \leftarrow \emptyset$
1:    for kg $\in \mathcal{K}$ do
2:       Compute $w_{kg} = P(kg|s, \theta_{enc})$
3:       for prog $\in \mathcal{P}$
4:          Compute $w_{prog} = P(prog|q, \theta_{prog})$
5:          $r \leftarrow R(kg, prog, a)$
6:          $\mathcal{D}_{kgRL} \leftarrow (s, kg, r \cdot w_{prog}, w_{kg})$
7:          $\mathcal{D}_{progRL} \leftarrow (q, prog, r \cdot w_{kg}, w_{prog})$
8:    return $D_{kgRL}, D_{progRL}$ In some implementations, the encoder model and programmer model can be trained using the following example algorithm.

Example Algorithm 3 Question Answering Training

Input: Example (s, q, a), models $\theta_{enc}$ and $\theta_{prog}$.
1:    $\mathcal{K} \leftarrow \text{beamSearch}(M_{enc}(s))$
2:    if do_tweak then
3:       $\mathcal{P} \leftarrow \text{beamSearch}(M_{prog}(q))$
4:       $\mathcal{K} \leftarrow \mathcal{K} \cup \mathcal{K}_{tweaked}$
5:    else
6:       $\mathcal{P} \leftarrow \emptyset$
7:    for kg $\in \mathcal{K}$ do
8:       $\mathcal{P}$ U beamSearch($M_{prog}(q)$, kg)
9:    $\mathcal{D}_{kgRL}, \mathcal{D}_{progRL} \leftarrow$ prepare datasets using Algorithm 2
10:   REINFORCE update $\theta_{enc}$ with $\mathcal{D}_{kgRL}$
11:   REINFORCE update $\theta_{prog}$ with $\mathcal{D}_{progRL}$ In some implementations, Example Algorithms 1 and 3, above, can be used in the following algorithm to train the natural language processing model.

Example Algorithm 4 Training

Input: Training examples $\varepsilon = \{(s, q, a)\}$, number of training epochs N, hyper-parameters do_qa_wait, do_tweak_wait.
Output: Three models: $\theta_{enc}, \theta_{dec},$ and $\theta_{prog}$
1:    for epoch $\leftarrow 1$ to N (s, q, a) $\in \varepsilon$ do
2:       do_auto = epoch $\leq$ do_qa_wait
3:       do_tweak = epoch > do_tweak_wait
4:       if do_auto then
5:          Autoencoder training using Algorithm 1
6:       else 7: Question answering training using Algorithm 3.

Additional or alternative algorithms can be used to perform the methods disclosed herein. Additionally, the above algorithms can be combined and/or modified in multiple ways.

Additional Disclosure

In some implementations, a computing system for responding to a natural language query can include an encoding system configured to receive a natural language text body and generate, using a machine-learned natural language encoder model, a knowledge graph based on the natural language text body. The computing system can include a query programming system configured to receive a natural language input query, and generate, using a machine-learned natural language query programmer model, a program for querying the knowledge graph based on the natural language input query. The computing system can include a query execution system configured to execute the generated program on the generated knowledge graph and to output a query response. In some implementations, at least one of the machine-learned natural language encoder model and the machine-learned natural language query programmer model can be a recurrent neural network or a sequence-to-sequence neural network.

In some implementations, the machine-learned natural language encoder model can trained by generating, using a machine-learned natural language decoder model, a reconstruction of the natural language text body based on the knowledge graph; calculating a reconstruction loss between the natural language text body and the reconstruction of the natural language text body; and training the machine-learned natural language encoder model and the machine-learned natural language decoder model using an autoencoder objective function which describes the reconstruction loss. In some implementations, the machine-learned natural language decoder model can be a recurrent neural network or a sequence-to-sequence neural network.

In some implementations, the machine-learned natural language encoder model and/or the machine-learned natural language query programmer model can be trained by receiving a natural language test query for the natural language text body, generating a test program for querying the knowledge graph based on the natural language test query, executing the generated test program on the knowledge graph to obtain a test query response, comparing the test query response with an expected query response for the natural language test query, and training the machine-learned natural language encoder model and the machine-learned natural language query programmer model using a question answer objective function which describes a reward that is based on the comparison of the test query response and the expected query response for the natural language test query. In some implementations, the machine-learned natural language encoder model and the machine-learned natural language query programmer model can be trained based on a total object function comprising the autoencoder objective function and the question answer objective function.

In some implementations, the encoding system can be configured to generate the knowledge graph by converting the natural language text body into a plurality of n-gram statements. In some implementations, the generated program can include one or more functions that include an argument, and executing each function of the program can cause the query execution system to discover at least one n-gram statement including the argument of the function, and to return a variable based on the function and the at least one discovered n-gram statement. In some implementations, the argument of at least one function in the generated program can refer to a variable returned by at least one other function of the generated program. In some implementations, the encoding system can be configured to generate a timestamp in association with each of the plurality of n-gram statements, and the timestamps can represent the order in which the n-gram statements are generated from the natural language text body.

In some implementations, the generated program can include at least one function which causes the query execution system to discover at least one n-gram statement including the argument of the function, and to return a variable based on the function and the timestamp of the at least one discovered n-gram statement. In some implementations, the encoding system can be configured to provide the query programming system with information on the knowledge graph, the information indicating at least one argument for a function which would return a variable when the function is executed.

In some implementations, the query programming system, in response to receiving an empty result returned by the query execution system for a function of the program, can be configured to provide the encoding system with at least one instruction to modify the knowledge graph. The instruction can indicate at least one modification to the knowledge graph which would reduce the probability of an empty result for the function.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
    at least one processor;
    a machine-learned natural language processing model comprising:
        an encoder model, wherein the encoder model is trained to receive a natural language text body and, in response to receipt of the natural language text body, generate a knowledge graph; and
        a programmer model, wherein the programmer model is trained to receive a natural language question, and, in response to receipt of the natural language question, output a program;
        wherein at least one of the programmer model and the encoder model has been trained based at least in part on a total objective function that comprises an autoencoder objective function in a first training stage and a question answer objective function in a second training stage following the first training stage, wherein the autoencoder objective function describes a reconstruction loss between the natural language text body and a reconstruction of the natural language text body that is output by a decoder model based on the knowledge graph, and wherein the question answer objective function describes a reward that is based on a comparison of an answer and an expected answer; and
    at least one tangible, non-transitory computer-readable medium that stores instructions that, when executed by the at least one processor, cause the at least one processor to perform operations, the operations comprising:
        obtaining the natural language text body;
        inputting the natural language text body into the encoder model;
        generating, using the encoder model, the knowledge graph;
        obtaining the natural language question;
        inputting the natural language question into the programmer model;
        receiving, as an output of the programmer model, the program; and
        executing the program on the knowledge graph to produce an answer to the natural language question.

2. The computing system of claim 1, wherein the program output by the programmer model comprises a function that causes a search of the knowledge graph.

3. The computing system of claim 1, wherein the knowledge graph comprises a plurality of n-gram sequences.

4. The computing system of claim 1, wherein the natural language text body comprises a plurality of sentences.

5. The computer system of claim 1, the operations further comprising:
    during the first training stage, applying a code assist function to the programmer model, wherein applying the code assist function comprises providing the programmer model with a set of potential functions, and wherein the programmer model is configured to select functions from the set of potential functions to generate the program; and
    during the second training stage, detecting if the answer comprises an empty set, and when it is detected that the answer comprises an empty set, applying, by the one or more computing devices, a structural tweaking function to the knowledge graph that is associated with reducing a probability of the answer comprising an empty set, and wherein the structural tweaking function is applied during the second training stage at a greater frequency than the code assist function is applied during the second training stage.

6. The computing system of claim 1, wherein at least one of the encoder model or the programmer model comprises a neural network.

7. The computing system of claim 6, wherein at least one of encoder model and the programmer model comprises a recurrent neural network.

8. The computing system of claim 6, wherein at least one of encoder model and the programmer model comprises a sequence-to-sequence neural network.

9. A computer-implemented method, the method comprising:
obtaining, by one or more computing devices, a natural language processing model that comprises an encoder model, a decoder model, and a programmer model, wherein the encoder model is configured to receive a natural language text body and, in response to receipt of the natural language text body, output a knowledge graph, wherein the decoder model is configured to receive the knowledge graph and, in response to receipt of the knowledge graph, output a reconstruction of the natural language text body, and wherein the programmer model is trained to receive a natural language question, and, in response to receipt of the natural language question, output a program;
inputting, by the one or more computing devices, a training data set that comprises the natural language text body and the natural language question into the natural language processing model to receive an answer to the natural language question;
defining, by the one or more computing devices, a total objective function that comprises an autoencoder objective function in a first training stage and a question answer objective function in a second training stage following the first training stage;
evaluating, by the one or more computing devices, the total objective function, wherein the autoencoder objective function describes a reconstruction loss between the natural language text body and the reconstruction of the natural language text body, and wherein the question answer objective function describes a reward that is based on a comparison of the answer and an expected answer included in the training data set; and
training, by the one or more computing devices, the natural language processing model based on the total objective function.

10. The computer-implemented method of claim 9, wherein training, by the one or more computing devices, the natural language processing model based on the total objective function comprises training, by the one or more computing devices, the programmer model based at least in part on the question answer objective function.

11. The computer-implemented method of claim 9, wherein training, by the one or more computing devices, the natural language processing model based on the total objective function comprises jointly training, by the one or more computing devices, the encoder model and the decoder model based at least in part on the autoencoder objective function.

12. The computer-implemented method of claim 9, wherein the question answer objective function also describes at least one of an encoder probability distribution that describes an input of the encoder model with respect to an output of the encoder model or a programmer probability distribution that describes an input of the programmer model with respect to an output of the programmer model.

13. The computer-implemented method of claim 9, further comprising applying, by the one or more computing devices, a code assist function to the programmer model, wherein applying the code assist function comprises providing the programmer model with a set of potential functions, and wherein the programmer model is configured to select a function from the set of potential functions to generate the program.

14. The computer-implemented method of claim 9, further comprising:
detecting, by the one or more computing devices, if the answer comprises an empty set; and
when it is detected that the answer comprises an empty set, applying, by the one or more computing devices, a structural tweaking function to the knowledge graph that is associated with reducing a probability of the answer comprising an empty set.

15. The computer-implemented method of claim 9, further comprising:
during the first training stage, applying, by the one or more computing devices, a code assist function to the programmer model, wherein applying the code assist function comprises providing the programmer model with a set of potential functions, and wherein the programmer model is configured to select functions from the set of potential functions to generate the program; and
during the second training stage that follows the first training stage, detecting, by the one or more computing devices, if the answer comprises an empty set, and when it is detected that the answer comprises an empty set, applying, by the one or more computing devices, a structural tweaking function to the knowledge graph that is associated with reducing a probability of the answer comprising an empty set, and wherein the structural tweaking function is applied during the second training stage at a greater frequency than the code assist function is applied during the second training stage.

16. A computing system for responding to a natural language query; comprising:
an encoding system configured to receive a natural language text body and generate, using a machine-learned natural language encoder model, a knowledge graph based on the natural language text body, wherein the machine-learned natural language encoder model is trained based at least in part on an autoencoder objective function in a first training stage, and wherein the autoencoder objective function describes a reconstruction loss between the natural language text body and a reconstruction of the natural language text body that is output by a decoder model based on the knowledge graph;
a query programming system configured to receive a natural language input query, and generate, using a machine-learned natural language query programmer model, a program for querying the knowledge graph based on the natural language input query, wherein the machine-learned natural language query programmer model is trained based at least in part on a question answer objective function in a second training stage following the first training stage, and wherein the question answer objective function describes a reward that is based on a comparison of a query response and an expected query response; and a query execution system configured to execute the generated program on the generated knowledge graph and to output the query response.

17. The computing system of claim 16, wherein at least one of the machine-learned natural language encoder model and the machine-learned natural language query programmer model is a recurrent neural network or a sequence-to-sequence neural network.

18. The computer system of claim 16, wherein the machine-learned natural language encoder model and the machine-learned natural language query programmer model are trained by:

applying a code assist function during the first training stage, wherein applying the code assist function comprises providing a set of potential functions, and wherein the machine-learned natural language query programmer model is configured to select functions from the set of potential functions to generate the program; and during the second training stage, detecting if the answer comprises an empty set, and when it is detected that the answer comprises an empty set, applying, by the one or more computing devices, a structural tweaking function to the knowledge graph that is associated with reducing a probability of the answer comprising an empty set, and wherein the structural tweaking function is applied during the second training stage at a greater frequency than the code assist function is applied during the second training stage.

19. The computing system of claim 16, wherein the machine-learned natural language encoder model is trained by:

generating, using a machine-learned natural language decoder model, the reconstruction of the natural language text body based on the knowledge graph;

calculating the reconstruction loss between the natural language text body and the reconstruction of the natural language text body; and training the machine-learned natural language encoder model and the machine-learned natural language decoder model using the autoencoder objective function which describes the reconstruction loss.

20. The computing system of claim 19, wherein the machine-learned natural language encoder model and the machine-learned natural language query programmer model are trained by:

receiving the natural language test query for the natural language text body;

generating a test program for querying the knowledge graph based on the natural language test query;

executing the generated test program on the knowledge graph to obtain a test query response;

comparing the test query response with an expected query response for the natural language test query; and training the machine-learned natural language encoder model and the machine-learned natural language query programmer model using the question answer objective function which describes a reward that is based on the comparison of the test query response and the expected query response for the natural language test query.

* * * * *